US012700005B1

(12) United States Patent
Nagarajan et al.

(10) Patent No.: US 12,700,005 B1
(45) Date of Patent: Aug. 4, 2026

(54) INTELLIGENT AND AUTONOMOUS LAYERED PLATFORM TO ORCHESTRATE VULNERABILITY SOLUTION IN A CROSS CHAIN ENVIRONMENT

(71) Applicant: Bank of America Corporation, Charlotte, NC (US)

(72) Inventors: Divya Nagarajan, Chennai (IN); Meenu Goyal, Punjab (IN); Pinky Panwar, Gujrat (IN)

(73) Assignee: Bank of America Corporation, Charlotte, NC (US)

( * ) Notice: Subject to any disclaimer, the term of this patent is extended or adjusted under 35 U.S.C. 154(b) by 23 days.

(21) Appl. No.: 19/044,781

(22) Filed: Feb. 4, 2025

(51) Int. Cl.
G06Q 20/40 (2012.01)

(52) U.S. Cl.
CPC ................................. G06Q 20/4016 (2013.01)

(58) Field of Classification Search
None
See application file for complete search history.

(56) References Cited

U.S. PATENT DOCUMENTS

| | | |
|---|---|---|
| 2019/0340266 A1 | 11/2019 | Vo et al. |
| 2020/0175003 A1 | 6/2020 | Jiang et al. |
| 2023/0063548 A1 | 3/2023 | Chen et al. |
| 2023/0259930 A1 | 8/2023 | Liu |

FOREIGN PATENT DOCUMENTS

| | | |
|---|---|---|
| WO | 2021023200 A1 | 2/2021 |
| WO | 2022141059 A1 | 7/2022 |
| WO | 2022206439 A1 | 10/2022 |
| WO | 2023082883 A1 | 5/2023 |
| WO | 2024103854 A1 | 5/2024 |
| WO | 2024146179 A1 | 7/2024 |

*Primary Examiner* — Neha Patel
*Assistant Examiner* — Nicholas K Phan
(74) *Attorney, Agent, or Firm* — Banner & Witcoff, Ltd.

(57) ABSTRACT

This invention provides a system and method for managing and securing cross-chain blockchain transactions through a layered, autonomous platform. It features a source orchestration layer employing optimistic replication and polymorphic encapsulation to ensure data redundancy and traceability. Transactions are encrypted and transmitted using an asynchronous handshake protocol that integrates bidirectional acknowledgment exchanges to validate transaction integrity. A destination orchestration layer decapsulates and verifies acknowledgment data, generating secondary acknowledgment requests for added validation. Transactions are validated by a blockchain of validators utilizing consensus mechanisms, such as proof-of-stake or proof-of-work, which produce cryptographic proofs of validation. Failed or suspicious transactions are isolated in a dead letter log, enabling further analysis and prioritization. The system combines advanced cryptographic techniques, redundancy algorithms, and decentralized consensus to enhance security, mitigate vulnerabilities, and ensure reliable operation in cross-chain environments. This invention optimizes transaction processing while addressing challenges such as scalability, data integrity, and malicious activity.

20 Claims, 5 Drawing Sheets

Sample System Architecture Diagram

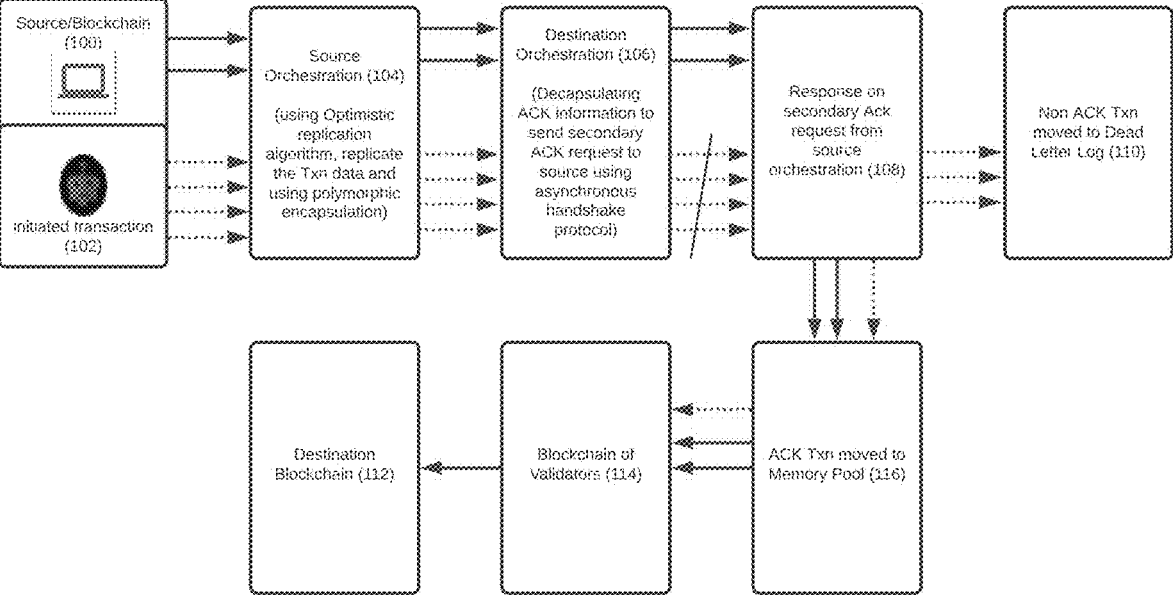
FIG. 1: Sample System Architecture Diagram

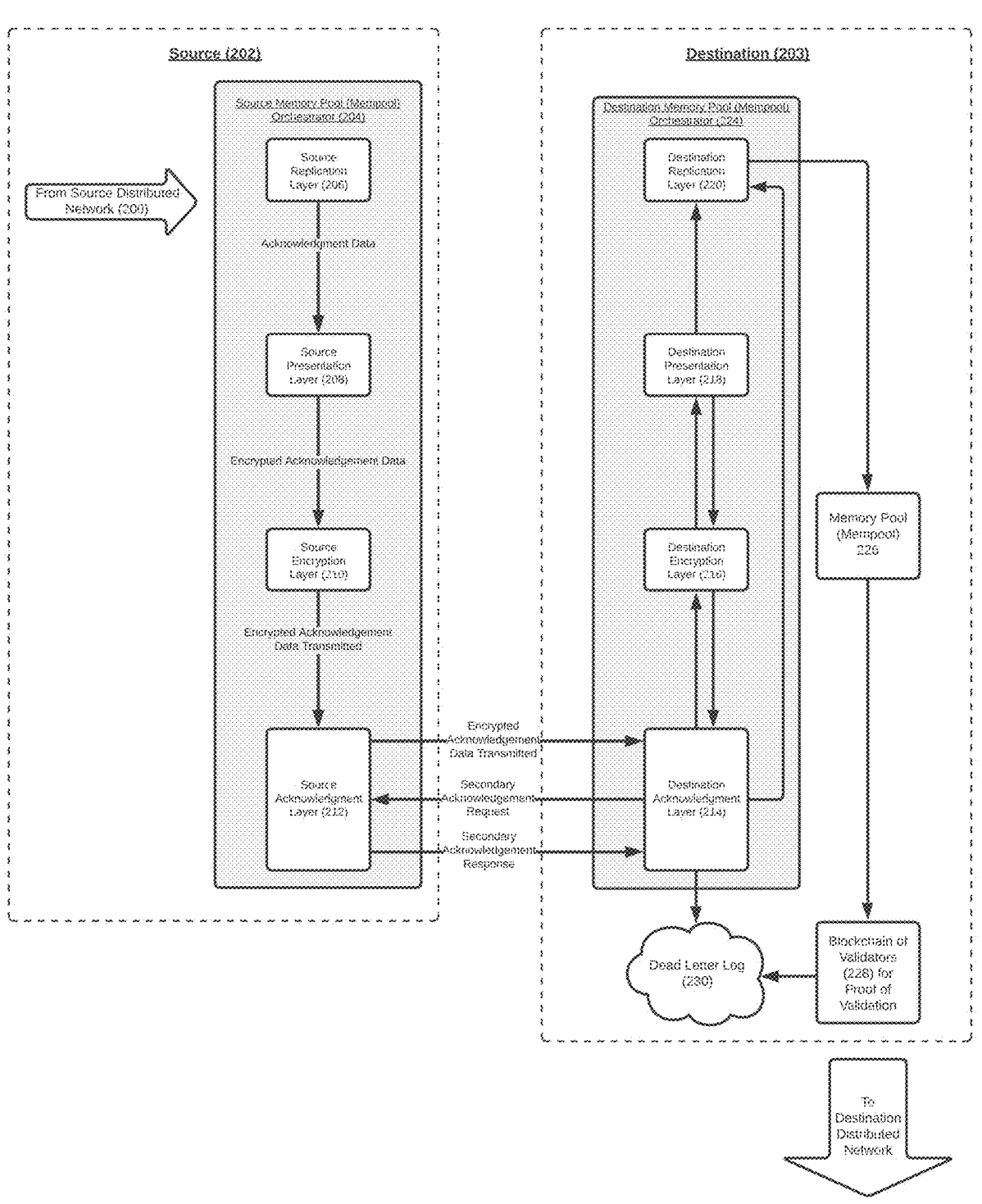
FIG. 2: Layer Diagram

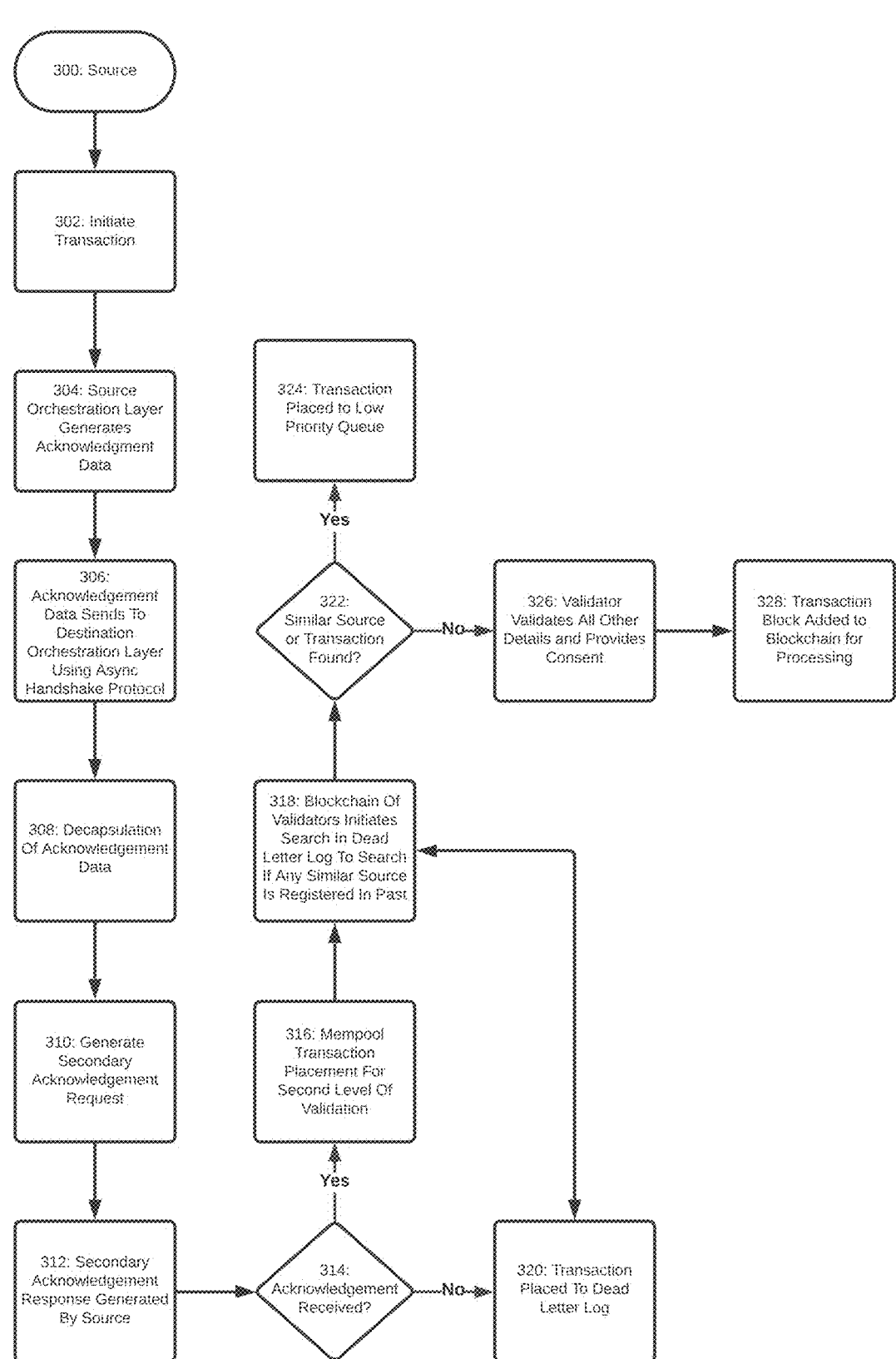
FIG. 3: Sample Flow Diagram

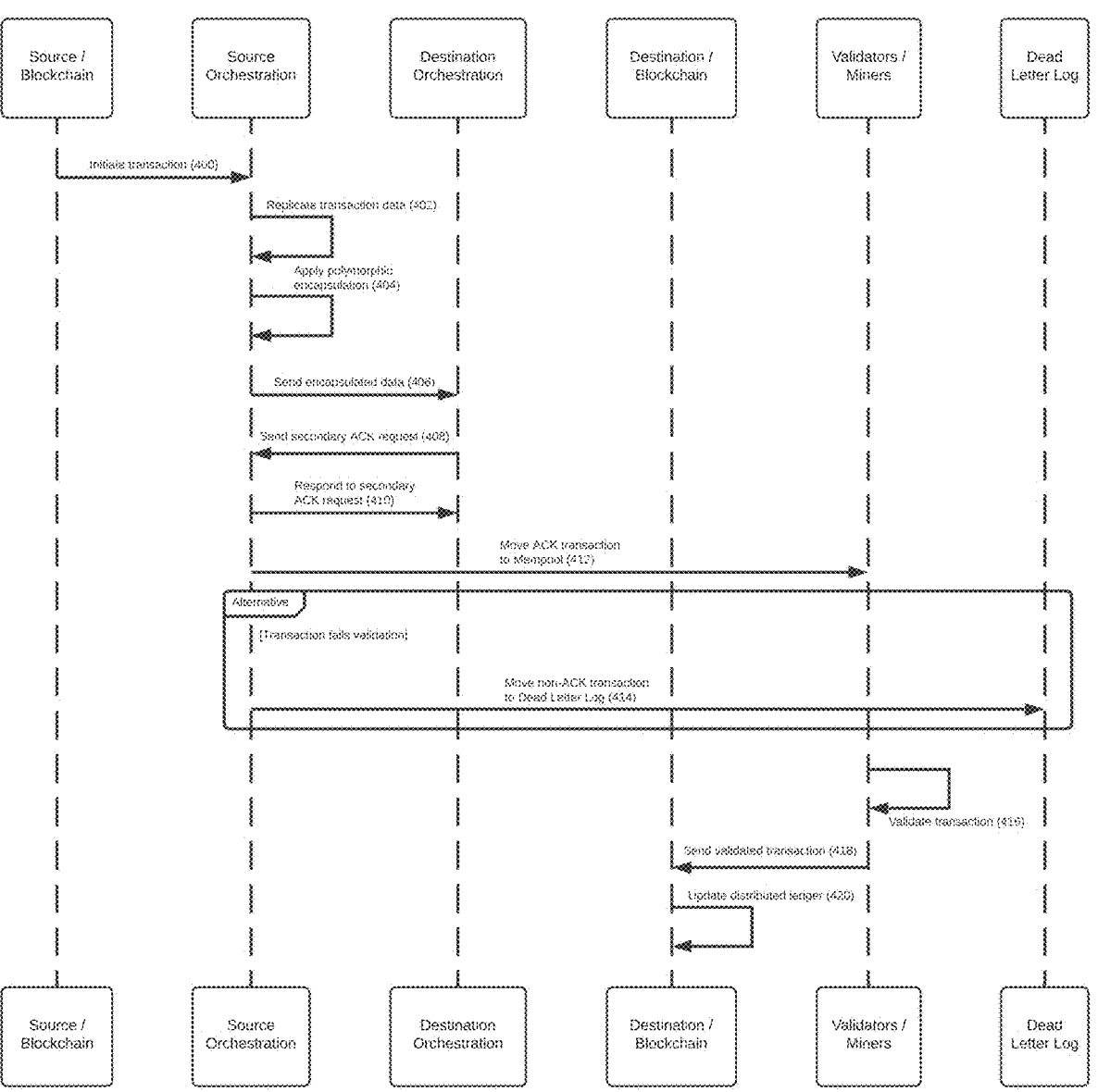
FIG. 4: Sample Sequence Diagram

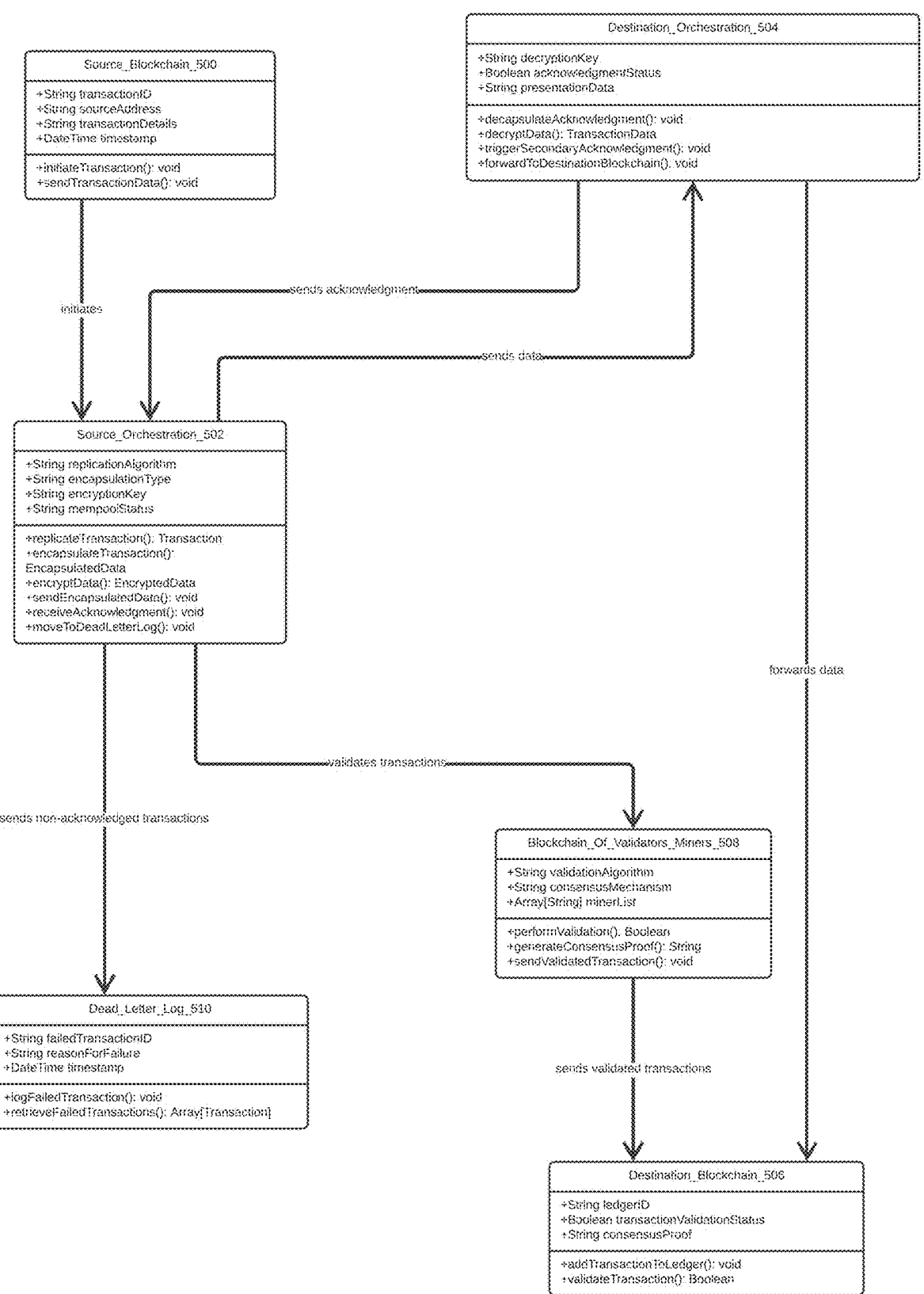
FIG. 5: Sample Class Diagram

INTELLIGENT AND AUTONOMOUS LAYERED PLATFORM TO ORCHESTRATE VULNERABILITY SOLUTION IN A CROSS CHAIN ENVIRONMENT

TECHNICAL FIELD

The inventions disclosed herein pertain to the fields of computer networks, cryptography, error detection and fault recovery, digital data processing systems, database and data structure management, and artificial intelligence. They relate to the management and orchestration of cross-chain blockchain transactions within distributed networks, ensuring secure and efficient communication between nodes through advanced replication algorithms, asynchronous handshake protocols, and consensus mechanisms. By employing cryptographic techniques such as lightweight encryption and polymorphic encapsulation, the inventions safeguard transaction data, mitigating vulnerabilities like unauthorized access and tampering. The inventions also address fault recovery and error handling through the integration of dead letter logs and layered validation, ensuring the continuity of legitimate transactions while isolating malicious ones. Additionally, the inventions enhance the management of transaction data using memory pool (mempool) orchestration to organize, validate, and prioritize transactions within distributed systems, improving data integrity and accessibility. The incorporation of historical data analysis and dynamic priority algorithms introduces intelligent decision-making capabilities, optimizing cross-chain transaction management and advancing the fields of distributed computing and blockchain technology.

DESCRIPTION OF THE RELATED ART

Modern distributed ledger technologies face critical challenges in achieving seamless interoperability between diverse blockchain networks. These networks operate independently, often utilizing different protocols, consensus mechanisms, and cryptographic methods. As a result, transactions involving multiple blockchain systems suffer from inefficiencies, lack of transparency, and vulnerabilities, which create significant barriers to adoption for industries requiring secure and efficient multi-chain operations. Without effective solutions, these fragmented systems fail to deliver the cohesive experience needed to maximize the potential of decentralized technologies.

Security vulnerabilities are exacerbated in cross-chain transactions due to the complexities introduced by the lack of standardized communication protocols. Attack vectors such as double-spending, replay attacks, and denial-of-service disruptions are prevalent when blockchain systems interact without robust safeguards. The absence of comprehensive validation mechanisms across networks often leads to unverified transactions being processed, undermining the reliability and trustworthiness of the entire ecosystem. These vulnerabilities erode confidence in multi-chain applications, impeding their broader application in financial, supply chain, and other industries.

Transaction validation across blockchain networks often relies on siloed mechanisms that fail to offer real-time reconciliation or validation assurances. This lack of consistency can lead to disputes, delayed settlements, and inefficient workflows. For businesses, the inability to verify cross-chain transactions in real-time introduces risks that hinder operational scalability. Furthermore, the reliance on manual reconciliation processes to address these gaps consumes resources and creates room for human error, further complicating already intricate systems.

The inefficiencies of current cross-chain systems also manifest in high latency and increased transaction costs. The need to replicate and synchronize data across multiple networks often results in redundancies, slowing down the transaction processing time and escalating operational expenses. For users and organizations alike, the inability to achieve cost-effective and time-efficient multi-chain interoperability undermines the promise of blockchain technology as a transformative solution.

Another significant problem lies in the lack of adaptability in current systems to accommodate rapid technological advancements. Blockchain networks are evolving, with newer protocols and mechanisms being introduced frequently. However, most cross-chain solutions are rigid, failing to adapt to these changes without requiring extensive and costly overhauls. This inflexibility limits the ability of organizations to remain competitive and adopt innovations seamlessly, creating a widening gap between evolving technology and its practical application.

Accountability and traceability, critical attributes in blockchain operations, are often compromised in multi-chain environments. Transactions involving multiple networks frequently lack a unified audit trail, making it difficult to track the origin, status, and progression of transactions. The absence of such transparency hinders regulatory compliance and increases the risk of fraudulent activities, thereby diminishing the overall utility of cross-chain operations.

Another fundamental issue is the inability of existing systems to recover or handle failed transactions effectively. Transactions that fail to achieve consensus or acknowledgment across networks often lead to unresolved states, creating data inconsistencies and potential losses. The lack of a robust mechanism to address such failures results in operational bottlenecks and poses significant risks, especially for critical applications such as financial transactions.

The scalability of multi-chain systems remains a persistent problem due to the limited capacity of blockchain networks to process large volumes of transactions. The inefficiency in orchestrating transactions across multiple blockchains further exacerbates these scalability limitations. Without an effective orchestration framework, scaling multi-chain operations to meet the demands of growing applications becomes an insurmountable challenge, stalling the adoption of blockchain technology in high-volume use cases.

The absence of standardization in how blockchains communicate with one another also contributes to the fragmentation of the ecosystem. Each blockchain's unique architecture often necessitates custom integration solutions, which are costly and time-consuming to develop. This lack of standardization creates barriers for businesses looking to implement cross-chain solutions, restricting the scalability and accessibility of blockchain technology.

Fraud prevention mechanisms in cross-chain environments remain inadequate, as traditional methods fail to address the unique challenges posed by decentralized systems. The inability to validate transactions comprehensively across networks leaves blockchain systems vulnerable, undermining the security and reliability of cross-chain applications. For industries dealing with sensitive or high-stakes transactions, this limitation poses a significant threat to adoption.

Real-time communication between blockchains is another area that suffers from severe limitations. Existing systems lack the infrastructure to support dynamic interactions, leading to delays and inefficiencies in executing transactions. For applications requiring immediate and seamless data exchange, such as supply chain management and decentralized finance, this shortcoming restricts the practical applicability of blockchain technologies.

Moreover, the fragmentation of blockchain systems creates an environment where critical data becomes siloed, reducing the value of distributed ledger technology as a whole. Without mechanisms to enable efficient data sharing and integration, blockchain systems fail to deliver on their promise of creating decentralized and unified ecosystems. This results in missed opportunities for innovation and collaboration across industries.

Blockchain's potential for robust fault tolerance and resilience is undermined in cross-chain applications. When one network experiences failures or disruptions, the interconnected systems often lack mechanisms to isolate and recover from these issues effectively. This absence of fault tolerance increases the risk of systemic failures and creates uncertainties for users and businesses relying on multi-chain operations.

The inability to efficiently orchestrate transactions and validations across blockchain networks also limits the utility of blockchain in enterprise settings. Large organizations require systems that can handle complex workflows involving multiple stakeholders and networks, but existing solutions are often inadequate. The lack of an effective orchestration framework reduces blockchain's competitiveness against centralized systems, deterring its adoption in enterprise environments.

The long-standing and unmet need for an effective solution to address these challenges stems from the widespread adoption of blockchain technology and its growing importance in critical industries. For years, the promise of blockchain interoperability has remained unfulfilled due to the limitations of existing systems. The inability to establish secure, scalable, and efficient communication between blockchain networks has hindered innovation and left industries unable to leverage the full potential of decentralized technology. This gap in functionality underscores the pressing need for a robust and adaptive solution capable of addressing the complex demands of multi-chain ecosystems, ensuring the reliability and effectiveness of blockchain technologies in real-world applications.

SUMMARY OF THE INVENTION

The invention provides an intelligent and autonomous platform designed to orchestrate secure and efficient solutions for managing vulnerabilities in cross-chain blockchain environments. The platform is structured as a multi-layered system that integrates advanced techniques for transaction validation, cryptographic security, and consensus-based verification. Its architecture is specifically designed to ensure that only legitimate transactions are processed while isolating and mitigating the impact of unauthorized or malicious activities. This approach represents a significant advancement in the management of blockchain ecosystems, particularly in addressing the challenges inherent in cross-chain transactions.

A central feature of the invention is its two-step validation process, which incorporates multiple layers of security and filtration. The first step employs smart contract orchestration facilitated by an asynchronous handshake protocol. This protocol ensures that transactions are validated through a multi-stage acknowledgment process before proceeding further. The orchestration uses polymorphic encapsulation techniques to encapsulate transaction data with acknowledgment information. This encapsulated data is transmitted securely between the source and destination blockchains. At the destination, the acknowledgment information is decapsulated and analyzed, allowing the system to trigger a secondary acknowledgment request to the source blockchain to confirm the transaction's legitimacy.

The asynchronous handshake protocol is a cornerstone of the invention's operation, establishing a dynamic and secure communication link between the source and destination blockchains. This protocol allows for the flow-controlled transmission of acknowledgment data, enabling robust validation of transaction authenticity. The secondary acknowledgment mechanism ensures that transactions originating from legitimate sources can proceed, while those failing to meet acknowledgment requirements are promptly isolated. This mechanism adds an important layer of security, preventing unauthorized transactions from reaching the destination blockchain and protecting the network from potential vulnerabilities.

The invention employs a mempool orchestration layer at both the source and destination blockchain environments to manage the processes of encapsulation, encryption, acknowledgment, and validation. This layer utilizes an optimistic replication algorithm to create secure replicas of transaction data without altering their content. By replicating transaction data in a secure manner, the mempool orchestration layer ensures redundancy and enhances the integrity of cross-chain communications. Furthermore, the mempool orchestrator governs the movement of transactions into subsequent layers of processing, ensuring that only validated transactions are queued for consensus-based verification.

A critical aspect of the invention is the dead letter log, a specialized mechanism for handling non-acknowledged or suspicious transactions. Transactions that fail the acknowledgment protocol or exhibit unusual patterns are moved to the dead letter log, where they are isolated for further analysis. This log serves as a repository for potentially malicious transactions, enabling validators to investigate and determine their disposition. By segregating these transactions, the system maintains the efficiency of legitimate transaction processing while offering a secure method for handling anomalies.

The second step of the validation process involves a blockchain of validators or miners, which provides an additional layer of security and verification. This layer uses a consensus mechanism, such as proof-of-stake or proof-of-work, to validate transaction details collectively. Validators examine historical data and apply priority algorithms to assess the legitimacy of transactions. This collective validation process enhances the reliability and security of the blockchain system by ensuring that only genuine transactions are added to the destination blockchain. Furthermore, validators are incentivized through rewards for their participation in maintaining the integrity of the network.

The invention integrates advanced cryptographic techniques, including lightweight encryption and polymorphic encapsulation, to secure transaction data during transmission. The encryption layer ensures the confidentiality and integrity of transaction information as it moves between the source and destination blockchains. Polymorphic encapsulation adds an additional dimension of security by embedding acknowledgment data within the transaction payload, creating a secure and traceable data structure. These cryptographic measures collectively safeguard the blockchain environment from unauthorized access and data tampering.

Another inventive feature of the platform is its presentation layer within the mempool orchestrator. This layer generates a unique encrypted transaction ID based on the replicated transaction data, adding headers, trailers, source addresses, and destination addresses to the transaction payload. By organizing and structuring the transaction data, the presentation layer prepares it for encryption, acknowledgment, and eventual validation by the blockchain of validators. This meticulous handling of transaction data ensures its security and integrity throughout the entire process.

The invention also introduces intelligent algorithms for dynamic prioritization of transactions. These algorithms analyze patterns, historical data, and acknowledgment responses to prioritize high-value or legitimate transactions. Suspicious or non-acknowledged transactions are assigned lower priority, ensuring the efficient allocation of network resources. This adaptive prioritization enhances the system's ability to process legitimate transactions quickly, even during periods of high network traffic or potential attacks.

The dead letter log mechanism supports a unique feature for re-evaluating and reprioritizing transactions. Validators can access the log to review past transactions, identify patterns, and decide whether to process certain transactions at a lower priority. This capability adds a layer of flexibility to the system, allowing it to adapt dynamically to changing network conditions and transaction volumes. By enabling the review of previously failed transactions, the system ensures transparency and accountability in its operations.

The invention is highly effective at minimizing the impact of Distributed Denial of Service (DDoS) attacks on cross-chain blockchain environments. The dual-layer validation process effectively filters out spam transactions and isolates malicious ones before they can disrupt the destination blockchain. By combining acknowledgment-based validation with consensus mechanisms, the invention creates a resilient framework that protects the network from large-scale attacks while maintaining its operational efficiency.

Scalability is another critical advantage of the invention. Its modular and layered design allows for seamless integration into existing blockchain networks and supports adaptation to growing transaction volumes. Each layer operates independently yet collaboratively, ensuring that the system can scale without compromising security or performance. This scalability makes the invention particularly well-suited for the evolving needs of cross-chain blockchain ecosystems.

The invention's layered approach addresses the operational challenges of cross-chain blockchain environments, including security, performance, and reliability. Its integration of cryptographic techniques, intelligent transaction management, and multi-layered validation processes ensures that transactions are processed securely and efficiently. This comprehensive approach represents a significant advancement in blockchain technology, setting a new standard for managing vulnerabilities in distributed networks.

The system's inventive features include polymorphic transaction encapsulation, asynchronous handshake communication protocol, mempool orchestration, optimistic replication algorithm, dead letter log, consensus validation, lightweight encryption, and blockchain of validators. These features collectively form a robust framework for orchestrating secure and efficient cross-chain blockchain transactions, enhancing the reliability and integrity of blockchain networks. In conclusion, the invention establishes a transformative solution for managing vulnerabilities in cross-chain environments, demonstrating significant technical innovation and practical utility.

The invention integrates a variety of unique, core, and key features that collectively establish a secure, efficient, and scalable platform for managing cross-chain blockchain transactions. Each feature addresses specific vulnerabilities and operational challenges, making the invention a comprehensive solution for modern blockchain environments. Below is a detailed explanation of these features:

a. Two-Step Validation Process: This dual-layered validation system is central to the invention. The first step involves smart contract orchestration using an asynchronous handshake protocol to validate transactions. The second step adds an additional layer of security through a blockchain of validators or miners that uses consensus mechanisms to approve transactions. This two-step approach ensures that malicious or unauthorized transactions are filtered out before they can reach the destination blockchain, significantly enhancing network security.

b. Asynchronous Handshake Protocol: The asynchronous handshake protocol establishes a dynamic and secure communication mechanism between the source and destination blockchains. By incorporating bidirectional acknowledgment data exchange, the protocol ensures that only validated transactions proceed. The inclusion of secondary acknowledgment requests adds a layer of verification that prevents robotic or unauthorized transactions from bypassing the system.

c. Polymorphic Encapsulation and Decapsulation: This technique allows transaction data to be encapsulated with acknowledgment information during transmission and decapsulated upon receipt. By embedding acknowledgment data within the transaction payload, polymorphic encapsulation ensures that each transaction is traceable and secure. This feature provides an additional layer of security while maintaining the integrity of the transaction data.

d. Optimistic Replication Algorithm: The optimistic replication algorithm is employed within the mempool orchestration layer to create secure replicas of transaction data. This ensures data redundancy and enhances reliability without altering the core transaction details. The algorithm plays a crucial role in maintaining data consistency and preparing it for subsequent validation.

e. Mempool Orchestration Layer: This layer is integral to the invention, as it manages the encapsulation, encryption, acknowledgment, and validation of transactions at both the source and destination blockchains. By serving as the central processing hub for transaction data, the mempool orchestration layer ensures the efficient flow of transactions through the system while maintaining robust security protocols.

f. Dead Letter Log: Transactions that fail the acknowledgment protocol or exhibit suspicious patterns are moved to the dead letter log. This mechanism isolates potentially malicious transactions, preventing them from disrupting the system. Validators can review and analyze the dead letter log to identify patterns, reprioritize certain transactions, or investigate anomalies, adding flexibility and adaptability to the platform.

g. Blockchain of Validators or Miners: This feature provides a second layer of validation through a decentralized group of validators or miners. Using consensus mechanisms such as proof-of-stake or proof-of-work, the validators collectively verify transaction legitimacy. The system also incentivizes validators with rewards, ensuring active participation and maintaining the integrity of the network.

h. Lightweight Encryption: Lightweight cryptography is employed to secure transaction data during transmission between the source and destination blockchains. This ensures the confidentiality and integrity of the data while minimizing computational overhead. By using lightweight encryption, the invention balances security and performance, making it suitable for high-throughput blockchain environments.

i. Dynamic Transaction Prioritization: Intelligent algorithms analyze transaction patterns and acknowledgment responses to prioritize legitimate and high-value transactions while deprioritizing suspicious or non-acknowledged ones. This dynamic prioritization ensures that network resources are allocated efficiently, even during high traffic or attack scenarios.

j. Presentation Layer for Data Structuring: The presentation layer generates a unique encrypted transaction ID and structures the data by adding headers, trailers, source, and destination addresses. This layer ensures that the transaction data is well-organized and ready for encryption and acknowledgment processes, improving the reliability and traceability of the system.

k. Consensus Mechanisms for Validation: The invention leverages consensus mechanisms such as proof-of-stake or proof-of-work within the blockchain of validators. These mechanisms enhance the reliability of transaction verification by requiring agreement from multiple validators. The use of consensus-based validation reduces the likelihood of unauthorized transactions and ensures the integrity of the blockchain.

l. Dead Letter Log Review and Reprioritization: The system allows validators to review transactions in the dead letter log and decide whether to process them at a lower priority or reject them entirely. This feature provides an additional layer of adaptability and transparency, ensuring that no transaction is discarded without analysis.

m. Scalability through Modular Design: The invention's layered and modular design ensures that it can scale seamlessly with increasing transaction volumes and network demands. Each layer operates independently yet collaborates with other layers to maintain system integrity, making it adaptable to evolving blockchain environments.

n. DDoS Attack Mitigation: By combining acknowledgment-based validation, consensus mechanisms, and dynamic prioritization, the invention effectively mitigates Distributed Denial of Service (DDoS) attacks. Spam and malicious transactions are isolated at multiple points in the process, ensuring that legitimate transactions are not disrupted.

o. Secure Cross-Chain Communication: The invention facilitates secure communication between source and destination blockchains through its layered security approach. By integrating cryptographic techniques, acknowledgment protocols, and consensus mechanisms, it ensures that transactions are securely transmitted and validated across different blockchain networks.

These and other features disclosed herein collectively establish the invention as a robust and efficient solution for managing vulnerabilities in cross-chain blockchain environments. Each feature contributes to the overall integrity, scalability, and security of the platform, addressing critical challenges in distributed ledger technology.

In light of the foregoing, the following provides a simplified summary of the present disclosure to offer a basic understanding of its various parts. This summary is not exhaustive, nor does it limit the exemplary aspects of the inventions described herein. It is not designed to identify key or critical elements or steps of the disclosure, nor to define its scope. Rather, it is intended, as understood by a person of ordinary skill in the art, to introduce some concepts of the disclosure in a simplified form as a precursor to the more detailed description that follows. The specification throughout this application contains sufficient written descriptions of the inventions, including exemplary, non-exhaustive, and non-limiting methods and processes for making and using the inventions. These descriptions are presented in full, clear, concise, and exact terms to enable skilled artisans to make and use the inventions without undue experimentation, and they delineate the best mode contemplated for carrying out the inventions.

In some arrangements, a method for managing vulnerabilities in cross-chain blockchain transactions includes detecting, by a source blockchain, the initiation of a transaction. The transaction comprises a transaction identifier, source address, transaction details, and a timestamp. The method further includes replicating, by a source orchestration layer, the transaction data using an optimistic replication algorithm to create a secure replica of the transaction without altering the original transaction details. The replicated transaction data is encapsulated, by the source orchestration layer, using polymorphic encapsulation to embed acknowledgment information within the transaction payload.

The method also includes encrypting, by an encryption layer within the source orchestration layer, the encapsulated transaction data using lightweight cryptography to ensure confidentiality and integrity during transmission. The encrypted transaction data is transmitted, by the source orchestration layer, to a destination orchestration layer over a communication link. Upon receipt, the destination orchestration layer decapsulates the acknowledgment information from the encrypted transaction data to verify the acknowledgment status and validate the integrity of the transaction data. The destination orchestration layer transmits a secondary acknowledgment request [0036] to the source orchestration layer using an asynchronous handshake protocol. The source orchestration layer receives the secondary acknowledgment request and transmits a secondary acknowledgment response to the destination orchestration layer within a predefined acknowledgment timeframe. The destination orchestration layer determines whether the acknowledgment response is received within the predefined timeframe. If the acknowledgment response is not received within the timeframe, the destination orchestration layer moves the transaction to a dead letter log. If the acknowledgment response is received within the timeframe, the destination orchestration layer moves the transaction to a destination mempool for further processing.

The method further includes validating, by a blockchain of validators, the transaction in the destination mempool using a consensus mechanism to confirm its legitimacy.

The consensus mechanism may include analyzing historical transaction data and applying priority algorithms. The blockchain of validators transmits a validation result to the destination blockchain, wherein a valid transaction is added to the destination blockchain, and an invalid transaction is moved to the dead letter log. The method concludes with prioritizing, by the blockchain of validators, transactions in the dead letter log based on predefined criteria, allowing intelligent algorithms to reprioritize transactions and determine their validity. Finally, validated transactions are added to the destination blockchain, ensuring secure, scalable, and efficient cross-chain transaction management.

In some arrangements, the acknowledgment information encapsulated by the source orchestration layer further comprises metadata detailing the source blockchain, destination blockchain, and a unique transaction signature. This metadata enhances traceability and ensures the integrity of the transaction by providing additional contextual information about its origin and destination.

In some arrangements, the metadata within the acknowledgment information is encrypted by the encryption layer using a public key of the destination orchestration layer. This encryption ensures that the metadata is securely transmitted and protected from unauthorized access during its journey from the source orchestration layer to the destination orchestration layer.

In some arrangements, the destination orchestration layer decapsulates the acknowledgment information using a private key corresponding to the public key of the source orchestration layer. This decapsulation process verifies the integrity and authenticity of the transaction data, ensuring that it has not been tampered with during transmission.

In some arrangements, the predefined acknowledgment timeframe for receiving the secondary acknowledgment response is dynamically adjusted based on network conditions, transaction priority, or historical acknowledgment patterns. This dynamic adjustment allows the system to optimize the acknowledgment process, improving efficiency and responsiveness under varying operational conditions.

In some arrangements, the dead letter log stores additional metadata for each transaction, including the reason for failure, the timestamp of acknowledgment attempts, and a transaction risk score. These details are based on predefined security metrics, enabling comprehensive analysis and informed decision-making regarding failed or suspicious transactions.

In some arrangements, the blockchain of validators uses a machine learning model to analyze historical transaction data in the destination mempool. The machine learning model predicts potential transaction risks and assigns dynamic priority levels, enhancing the system's ability to identify and mitigate vulnerabilities proactively.

In some arrangements, the consensus mechanism employed by the blockchain of validators comprises a hybrid model combining proof-of-stake and proof-of-work. This hybrid model optimizes transaction validation by leveraging the strengths of both mechanisms, ensuring a balance between security, efficiency, and resource utilization.

In some arrangements, the blockchain of validators applies intelligent algorithms to review transactions in the dead letter log. These algorithms reprioritize transactions based on predefined risk tolerance thresholds and determine their validity, allowing the system to process previously failed transactions more effectively.

In some arrangements, the destination blockchain maintains an audit log of all validated transactions, acknowledgment exchanges, and consensus decisions. This audit log provides a tamper-proof record that supports compliance with regulatory requirements and facilitates forensic analysis in cases of detected anomalies or failures.

In some arrangements, a method for managing vulnerabilities in cross-chain blockchain transactions includes detecting, by a source blockchain, the initiation of a transaction, wherein the transaction comprises a transaction identifier, a source address, transaction details, a timestamp, and an initial priority level determined based on predefined transaction criteria. The method further includes replicating, by a source orchestration layer, the transaction data using an optimistic replication algorithm to create a secure replica of the transaction without altering its original details. The replicated transaction data is encapsulated, by the source orchestration layer, using polymorphic encapsulation to embed acknowledgment information within the transaction payload. The acknowledgment information includes metadata specifying the source blockchain, destination blockchain, and a unique acknowledgment token generated by the source orchestration layer.

The method also includes encrypting, by an encryption layer within the source orchestration layer, the encapsulated transaction data using lightweight cryptography to ensure confidentiality and integrity during transmission. The acknowledgment token and metadata are encrypted using a public key associated with a destination orchestration layer to prevent unauthorized access. The encrypted transaction data is transmitted, by the source orchestration layer, to the destination orchestration layer over a secure communication link, wherein the communication link embeds a cryptographic nonce in the transaction payload to prevent replay attacks.

The method further includes decapsulating, by the destination orchestration layer, the acknowledgment information from the encrypted transaction data. The decapsulation process involves decrypting the acknowledgment information using a private key corresponding to the public key of the source orchestration layer to validate the integrity and authenticity of the transaction data. The destination orchestration layer transmits a secondary acknowledgment request to the source orchestration layer using an asynchronous handshake protocol, wherein the secondary acknowledgment request includes a verification token generated by the destination orchestration layer to establish the validity of the transaction.

The source orchestration layer receives the secondary acknowledgment request and transmits a secondary acknowledgment response to the destination orchestration layer within a predefined acknowledgment timeframe. The acknowledgment timeframe is dynamically adjusted based on network latency, transaction priority, and historical acknowledgment patterns. The destination orchestration layer determines whether the acknowledgment response is received within the predefined acknowledgment timeframe, wherein the determination includes validating the response against the verification token generated by the destination orchestration layer.

The method includes moving, by the destination orchestration layer, the transaction to a dead letter log if the acknowledgment response is not received within the predefined acknowledgment timeframe. The dead letter log stores metadata for each transaction, including the reason for failure, timestamps of acknowledgment attempts, the cryptographic nonce used during transmission, and a transaction risk score based on predefined security metrics and historical transaction patterns. If the acknowledgment response is received within the predefined acknowledgment timeframe, the transaction is moved to a destination mempool for further processing. The destination mempool queues transactions for validation and prioritizes them based on their risk scores, priority levels, and acknowledgment status.

The method further includes validating, by a blockchain of validators, the transaction in the destination mempool using a consensus mechanism to confirm its legitimacy. The consensus mechanism comprises a hybrid model combining proof-of-stake and proof-of-work and includes analyzing historical transaction data and applying priority algorithms. The blockchain of validators utilizes a machine learning model to detect anomalies and dynamically assign updated priority levels to transactions. The blockchain of validators transmits a validation result to the destination blockchain, wherein a valid transaction is added to the destination blockchain, and an invalid transaction is moved to the dead letter log. The blockchain of validators also prioritizes transactions in the dead letter log based on predefined criteria and applies intelligent algorithms to reprioritize transactions and determine their validity. The method concludes with adding validated transactions to the destination blockchain, wherein the destination blockchain maintains a tamper-proof audit log of all validated transactions, acknowledgment exchanges, consensus decisions, and validation attempts. This audit log enables compliance with regulatory requirements and facilitates forensic analysis for detected anomalies or failures.

In some arrangements, a system for managing vulnerabilities in cross-chain blockchain transactions includes a source blockchain configured to initiate a transaction, wherein the transaction comprises a transaction identifier, a source address, transaction details, a timestamp, and an initial priority level determined based on predefined transaction criteria. The system further includes a source orchestration layer coupled to the source blockchain and configured to replicate transaction data using an optimistic replication algorithm to create a secure replica of the transaction without altering its original details. The source orchestration layer is also configured to encapsulate the replicated transaction data using polymorphic encapsulation to embed acknowledgment information. The acknowledgment information includes metadata specifying the source blockchain, destination blockchain, and a unique acknowledgment token generated by the source orchestration layer.

The system includes an encryption layer within the source orchestration layer configured to encrypt the encapsulated transaction data using lightweight cryptography, wherein the acknowledgment token and metadata are encrypted using a public key associated with a destination orchestration layer to ensure confidentiality and prevent unauthorized access during transmission. A transmission module within the source orchestration layer is configured to transmit the encrypted transaction data to the destination orchestration layer over a secure communication link. The communication link embeds a cryptographic nonce in the transaction payload to prevent replay attacks.

The system further includes a destination orchestration layer configured to receive and decapsulate the acknowledgment information from the encrypted transaction data. The decapsulation process involves decrypting the acknowledgment information using a private key corresponding to the public key of the source orchestration layer to validate the integrity and authenticity of the transaction data. A handshake protocol module within the destination orchestration layer is configured to transmit a secondary acknowledgment request to the source orchestration layer. The secondary acknowledgment request includes a verification token generated by the destination orchestration layer to establish the validity of the transaction.

The system also includes an acknowledgment response module within the source orchestration layer configured to receive the secondary acknowledgment request and transmit a secondary acknowledgment response to the destination orchestration layer within a predefined acknowledgment timeframe. The acknowledgment timeframe is dynamically adjusted based on network latency, transaction priority, and historical acknowledgment patterns. A decision module within the destination orchestration layer is configured to determine whether the secondary acknowledgment response is received within the predefined acknowledgment timeframe. The determination includes verifying the response against the verification token generated by the destination orchestration layer.

The system includes a dead letter log coupled to the destination orchestration layer and configured to store transactions for which acknowledgment responses are not received within the predefined acknowledgment timeframe. The dead letter log stores metadata for each transaction, including the reason for failure, timestamps of acknowledgment attempts, the cryptographic nonce used during transmission, and a transaction risk score based on predefined security metrics and historical transaction patterns. The system also includes a destination mempool coupled to the destination orchestration layer and configured to queue transactions for further processing if the acknowledgment response is received within the predefined acknowledgment timeframe. The mempool prioritizes transactions based on risk scores, priority levels, and acknowledgment status.

The system further includes a blockchain of validators coupled to the destination mempool and configured to validate transactions using a consensus mechanism to confirm their legitimacy. The consensus mechanism comprises a hybrid model combining proof-of-stake and proof-of-work and includes analyzing historical transaction data and applying priority algorithms. The blockchain of validators utilizes a machine learning model to detect anomalies and dynamically assign updated priority levels to transactions. A validation result module within the blockchain of validators is configured to transmit a validation result to a destination blockchain. The validation result includes cryptographic evidence of consensus derived from validator agreement, and valid transactions are added to the destination blockchain, while invalid transactions are moved to the dead letter log.

The system includes a prioritization module within the blockchain of validators configured to review transactions in the dead letter log and prioritize them based on predefined criteria. Intelligent algorithms are applied to determine whether to resubmit or discard each transaction based on updated risk thresholds. The destination blockchain is configured to record validated transactions and maintain a tamper-proof audit log of all validated transactions, acknowledgment exchanges, consensus decisions, and validation attempts. This audit log enables compliance with regulatory requirements and facilitates forensic analysis for detected anomalies or failures.

In some arrangements, the acknowledgment information encapsulated by the source orchestration layer further comprises a cryptographic hash of the transaction details and metadata. This cryptographic hash ensures data integrity during encapsulation and transmission, providing a secure mechanism to verify that the transaction data has not been altered.

In some arrangements, the encryption layer within the source orchestration layer employs post-quantum cryptographic algorithms. These algorithms provide resistance against quantum computing attacks while maintaining lightweight processing requirements to ensure efficient transaction handling.

In some arrangements, the transmission module includes a monitoring component configured to dynamically adjust the cryptographic nonce embedded in the transaction payload. This adjustment is based on real-time network conditions and enhances security by preventing replay attacks and mitigating timing-based vulnerabilities.

In some arrangements, the destination orchestration layer includes a verification module configured to cross-reference the decapsulated acknowledgment information with a historical transaction ledger. This cross-referencing mechanism identifies and flags potential duplicate transactions, ensuring the uniqueness and legitimacy of all processed transactions.

In some arrangements, the handshake protocol module transmits the secondary acknowledgment request with a dynamically generated challenge-response token. This token authenticates the source orchestration layer and prevents spoofing attempts, adding an additional layer of security to the transaction validation process.

In some arrangements, the acknowledgment response module within the source orchestration layer includes a failover mechanism. This mechanism routes the secondary acknowledgment response through an alternative communication channel if the primary channel experiences connectivity issues or latency, ensuring uninterrupted transaction validation.

In some arrangements, the blockchain of validators utilizes a decentralized nomination system to weight validator contributions based on their historical accuracy and reliability in validation processes. This system ensures that highly trusted validators have a greater influence on the consensus mechanism, enhancing the security and efficiency of the validation process.

In some arrangements, the destination blockchain includes a machine learning-powered anomaly detection module. This module analyzes the audit log for patterns indicative of emerging threats, fraud, or non-compliant behaviors, enabling proactive network defense and operational adjustments to ensure the security and integrity of the blockchain network.

The following description and claims, in conjunction with the drawings—all integral parts of this specification—will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on computer-readable media, configured as computer modules, or in other computer constructs. These steps and functionalities may be executed on a single device or distributed across multiple devices interconnected with one another. However, it is important to acknowledge that the drawings primarily serve for descriptive and illustrative purposes and are not intended to delineate the limits of the invention. Unless contextually evident, the singular forms of "a," "an," and "the" used throughout the specification and claims should be interpreted to include their plural counterparts.

BRIEF DESCRIPTION OF DRAWINGS

FIG. 1 illustrates an exemplary system architecture for managing cross-chain blockchain transactions, highlighting the interactions between the source blockchain, source orchestration layer, destination orchestration layer, and destination blockchain. The diagram also depicts the sample flow of transaction replication, acknowledgment, validation, and handling of non-acknowledged transactions using the dead letter log.

FIG. 2 shows a layer diagram of the system, detailing the replication, presentation, encryption, and acknowledgment layers at both the source and destination orchestration layers. Each layer's function in encapsulating, encrypting, and processing transaction data for secure and efficient handling is represented.

FIG. 3 presents a flow diagram outlining a sample end-to-end process of transaction handling, starting from initiation at the source blockchain to final validation or logging at the destination blockchain. It includes steps for acknowledgment exchange, mempool placement, consensus validation, and dead letter log handling.

FIG. 4 depicts a sample sequence diagram illustrating exemplary interactions between system components, including the source blockchain, orchestration layers, validators, and the dead letter log. The diagram emphasizes the sequence of steps in transaction replication, acknowledgment exchange, and consensus-driven validation.

FIG. 5 provides a sample class diagram defining the attributes and methods for key system components such as the source blockchain, orchestration layers, validators, and the dead letter log. The relationships and interactions between these components are outlined to support the system's functionality.

DETAILED DESCRIPTION

The invention provides an advanced and autonomous platform for managing vulnerabilities in cross-chain blockchain transactions. It is designed to ensure secure, efficient, and reliable transaction processing between interconnected blockchain networks. The platform employs a layered approach to validation and acknowledgment, combining advanced cryptographic techniques, intelligent prioritization algorithms, and consensus-driven verification mechanisms to handle transactions while minimizing the risks associated with malicious or unauthorized activity.

At its core, the invention incorporates a two-step validation process that strengthens transaction security. The first step involves smart contract orchestration facilitated by an asynchronous handshake protocol. This protocol establishes a bidirectional exchange of acknowledgment data between the source and destination blockchains. During this step, transactions are encapsulated with acknowledgment information to ensure they are traceable and securely transmitted to their destination.

A unique feature of the invention is its use of polymorphic encapsulation for embedding acknowledgment data into transaction payloads. This encapsulation ensures that acknowledgment information is inseparable from the transaction data, providing both authenticity and integrity. The system uses lightweight cryptographic algorithms to encrypt this encapsulated data, ensuring secure communication during transmission across blockchain networks.

The invention includes a source orchestration layer that performs replication, encapsulation, and encryption of transaction data. This layer uses an optimistic replication algorithm to create secure replicas of the transaction data, enhancing redundancy and ensuring data consistency. After replication, the encapsulated data is encrypted and transmitted to the destination orchestration layer over a secure communication link, which includes a cryptographic nonce to protect against replay attacks.

The destination orchestration layer receives the encrypted transaction data, decrypts it using a private key corresponding to the public key of the source orchestration layer, and validates its integrity. This validation includes decapsulating the acknowledgment information to analyze and verify the transaction. The destination orchestration layer then triggers a secondary acknowledgment request, sent back to the source orchestration layer, to confirm the legitimacy of the transaction.

The asynchronous handshake protocol enables this secondary acknowledgment exchange, ensuring that transactions are validated in real time. The source orchestration layer must respond to the acknowledgment request within a predefined timeframe, which is dynamically adjusted based on network conditions, transaction priority, and historical acknowledgment patterns. This flexibility allows the system to adapt to varying operational environments and optimize transaction handling.

Transactions that fail to meet acknowledgment requirements or do not respond within the predefined timeframe are moved to a dead letter log. This log stores metadata for each transaction, including timestamps of acknowledgment attempts, cryptographic nonces, and risk scores. Validators and system administrators can analyze this data to identify patterns, prioritize transactions for re-evaluation, or isolate potentially malicious activity.

Acknowledged transactions are forwarded to the destination mempool for further processing and validation. The mempool temporarily queues these transactions, prioritizing them based on acknowledgment status, risk scores, and initial priority levels. This dynamic prioritization ensures that legitimate transactions are processed efficiently while suspicious or low-priority ones are handled appropriately.

The system's second validation step is performed by a blockchain of validators. This layer uses a hybrid consensus mechanism, combining proof-of-stake and proof-of-work to balance security and efficiency. Validators collectively analyze transaction data, detect anomalies, and assign updated priority levels using intelligent algorithms. This collaborative validation ensures the integrity of the transactions before they are finalized on the destination blockchain.

Validated transactions are added to the destination blockchain, while invalid ones are returned to the dead letter log for further analysis. The blockchain of validators transmits a validation result that includes cryptographic evidence of consensus. This result provides transparency and accountability, ensuring that the system operates with a high degree of reliability and trustworthiness.

The destination blockchain maintains a tamper-proof audit log of all validated transactions, acknowledgment exchanges, and consensus decisions. This audit log supports regulatory compliance and forensic analysis, enabling stakeholders to monitor system performance and address any anomalies or security concerns. By preserving an immutable record of these activities, the system enhances transparency and trust in blockchain operations.

The invention also integrates machine learning algorithms to analyze historical transaction data and predict potential risks. These algorithms support intelligent prioritization by dynamically adjusting transaction handling based on detected patterns and behaviors. This capability enhances the system's ability to respond proactively to emerging threats or changes in network conditions.

Privacy and security are further ensured through the use of post-quantum cryptographic algorithms and additional privacy-preserving features. These measures protect sensitive transaction data against current and future security threats, making the system robust and forward-compatible. The platform is adaptable to diverse use cases, including financial transactions, supply chain management, and IoT-based blockchain applications.

The modular design of the invention allows for seamless scalability and integration with existing blockchain networks. Each layer operates independently while collaborating with others to maintain system integrity and efficiency. This scalability ensures the platform can handle growing transaction volumes without compromising its performance or security.

In conclusion, the invention establishes a transformative approach to managing cross-chain blockchain transactions. By combining advanced validation mechanisms, cryptographic security, intelligent prioritization, and real-time acknowledgment, the system addresses critical challenges in modern blockchain ecosystems. Its layered architecture and innovative features set a new standard for secure, efficient, and scalable blockchain transaction management.

The description of various example embodiments herein is intended to achieve the goals previously outlined, referencing the illustrations included in this disclosure. These illustrations depict multiple systems and methods for implementing the disclosed information. It should be recognized that alternative implementations are possible, and modifications to both structure and functionality may be made. The description details various connections between elements, which should be interpreted broadly. Unless explicitly stated otherwise, these connections can be either direct or indirect and may be established through either wired or wireless methods. This document does not aim to restrict the nature of these connections.

In various configurations, terms such as "computers" and "machines" refer to devices that may be general-purpose or specialized for specific tasks, whether physical or virtual, and capable of network connectivity. These devices encompass all necessary hardware, software, and components known to skilled practitioners, including application-specific integrated circuits (ASICs), microprocessors, cores, or other processing units. These components execute, control, or implement various types of software, instructions, data, modules, processes, or routines. The terms used do not restrict the device type and should be broadly interpreted. Software, data, and executable code can reside on various physical, computer-readable storage devices, such as local memory, cloud-based storage, or network-attached storage. These can be stored in both volatile and non-volatile memory and may function autonomously or respond to specific triggers. These elements can be consolidated or distributed across multiple devices and stored in accessible memory systems such as distributed databases, big data infrastructures, blockchains, or distributed ledgers.

Networks and similar references refer to a broad range of communication systems, from local area networks (LANs) and wide area networks (WANs) to the Internet and cloud-based networks, supporting wired and wireless configurations. Specialized networks like digital subscriber line (DSL), frame relay, asynchronous transfer mode (ATM), and virtual private networks (VPN) are included. These networks utilize various hardware and software components, including modems, routers, firewalls, switches, and adapters, to facilitate communication. Networks are also equipped with virtual IP addresses and support multiple protocols like HTTPS, enabling effective packet-based data transmission and communication.

Generative Artificial Intelligence (AI) refers to AI techniques that learn from training data and generate new content, such as text, code, images, and audio. Generative AI systems, often powered by large language models (LLMs) like GPT-3, GPT-4, Meta LLaMA, and others, can be deployed through APIs, search engines, or chatbots. These models, which may be proprietary or open source, leverage deep learning methods and are generally governed by enterprise policies regarding AI and risk. Models such as BERT, T5, AlphaFold, Watson, Megatron, and others play a role in generating or interpreting language and content for various applications.

Generative AI and LLMs are utilized throughout this disclosure for tasks including natural language processing, data analysis, real-time processing, software development, and creative content generation. Specific functions include trend analysis, data classification, sentiment analysis, writing assistance, language translation, and decision-making support. These models enable capabilities like feedback learning, context determination, and comprehensive search operations, improving performance through iterative learning and feedback from human or system interactions. The wide range of applications supported by generative AI makes these systems a powerful tool in generating, analyzing, and managing information across diverse fields. All configurations and uses of these models are within the scope of this disclosure.

FIG. 1 presents a detailed and structured system architecture designed to address vulnerabilities in cross-chain blockchain transactions, showcasing a methodical flow of a transaction from its initiation at the source blockchain to its ultimate validation or isolation at the destination blockchain. This system provides a comprehensive framework that ensures security, efficiency, and reliability through a series of layered operations, each contributing to the integrity of the process.

The system begins with the source blockchain, labeled as element 100, which acts as the origin point for all transactions entering the network. Within the source blockchain, transactions are generated with essential attributes, including a unique transaction identifier, source address, destination address, and detailed information about the transaction itself. This initial step ensures that each transaction is traceable and identifiable throughout its lifecycle. The transactions, once created, are referred to as initiated transactions, indicated as element 102. These initiated transactions are prepared to undergo a series of processes designed to enhance their security and reliability while maintaining their integrity as they move through the system.

The next stage involves the source orchestration layer, represented by element 104. This layer is a critical component that handles the initial processing of the transaction data. The source orchestration employs an optimistic replication algorithm, which replicates the transaction data securely without altering its original content. This replication process creates redundancy and ensures that the transaction data remains available and consistent, even in cases of system disruptions or failures. Additionally, the source orchestration layer applies polymorphic encapsulation, a technique that embeds acknowledgment information into the transaction data. This encapsulation process adds metadata to the transaction, such as the source blockchain, destination blockchain, and a unique acknowledgment token, ensuring that the transaction is both traceable and secure throughout its journey.

After processing by the source orchestration layer, the transaction data is transmitted to the destination orchestration layer, denoted as element 106. At this stage, the transaction undergoes further processing to verify its integrity and authenticity. The destination orchestration layer begins by decapsulating the acknowledgment information embedded in the transaction during the source orchestration stage. This process extracts and analyzes the acknowledgment metadata to confirm the legitimacy of the transaction. Additionally, the destination orchestration establishes an asynchronous handshake protocol, which creates a dynamic and secure communication link between the source and destination orchestration layers. This protocol enables the destination orchestration to send a secondary acknowledgment request back to the source orchestration layer, further validating the transaction by requiring a response within a predefined timeframe.

The system then assesses the response to the secondary acknowledgment request, represented by element 108. If the source orchestration layer provides a valid acknowledgment response within the specified timeframe, the transaction is categorized as acknowledged and continues through the system. However, if the acknowledgment is not received or fails to meet the required criteria, the transaction is designated as a non-acknowledged transaction and moved to the dead letter log, indicated as element 110. The dead letter log serves as a secure repository for failed or suspicious transactions, isolating them from the main processing flow. This isolation ensures that such transactions do not interfere with the processing of legitimate transactions and allows for further analysis to identify potential malicious activity or errors.

Acknowledged transactions, on the other hand, are transferred to the memory pool, identified as element 116. The memory pool acts as a temporary staging area where transactions await further validation. In this stage, transactions are organized and prioritized based on predefined criteria such as acknowledgment status, risk scores, and transaction priority levels. This prioritization ensures that legitimate transactions are processed efficiently, even during periods of high network traffic or potential attacks.

The next layer of validation is performed by the blockchain of validators, represented as element 114. This component consists of a decentralized group of validators that collectively analyze and validate each transaction. Using consensus mechanisms, such as proof-of-stake or proof-of-work, the validators examine transaction details to confirm their legitimacy. This second level of validation provides an additional layer of security, ensuring that only genuine transactions proceed further in the system. The validators also play a crucial role in mitigating potential threats, such as Distributed Denial of Service (DDoS) attacks, by isolating and rejecting suspicious transactions.

Validated transactions are then recorded in the destination blockchain, shown as element 112. This blockchain serves as an immutable ledger, maintaining a permanent and transparent record of all completed transactions. By securely storing validated transactions, the destination blockchain ensures their integrity and provides a tamper-proof audit trail that supports regulatory compliance and forensic analysis.

The overall architecture depicted in FIG. 1 exemplifies a robust and scalable approach to managing vulnerabilities in cross-chain blockchain environments. Each component and process is designed to enhance the security, reliability, and efficiency of transaction handling, from the initial generation of transactions at the source blockchain to their final validation and storage in the destination blockchain. By integrating advanced techniques such as optimistic replication, polymorphic encapsulation, asynchronous handshake protocols, and consensus-driven validation, this system addresses critical challenges and sets a new standard for secure and efficient cross-chain blockchain transactions.

FIG. 2 provides a detailed layer diagram that demonstrates the sequential and organized structure of a system designed to manage vulnerabilities in cross-chain blockchain transactions. This architecture emphasizes security, efficiency, and reliability by employing a layered approach to process transactions from their origin in a source network to their final validation and storage in a destination network. Each layer in the diagram represents a distinct function in the transaction lifecycle, contributing to a robust and scalable system capable of addressing the complexities and risks associated with cross-chain operations.

The process begins within the source distributed network, identified as element 200, which serves as the origin of transaction data. This distributed network creates and prepares transaction information that includes essential details such as unique transaction identifiers, source addresses, destination addresses, and other metadata necessary for traceability and verification. Once generated, the transaction data enters the source, labeled as element 202, which acts as the initial processing point. At this stage, the transaction is handed over to the source memory pool orchestrator, shown as element 204. This orchestrator temporarily holds the transaction data while ensuring that it is properly queued and ready for processing by the subsequent layers. The source memory pool orchestrator optimizes the flow of transactions within the source environment, facilitating an organized transition to the next stages of processing.

The source replication layer, denoted as element 206, represents the first critical layer of the system, where the transaction undergoes replication. This replication process employs advanced algorithms designed to create secure duplicates of the transaction data without altering its original content. By generating replicated copies, the system enhances data reliability and provides redundancy, ensuring that transaction details remain intact and available even in the event of system failures or disruptions. The replication layer also organizes the transaction data to ensure consistency, laying the foundation for secure processing throughout the system. This replication step is vital for maintaining data integrity, as any inconsistencies or errors in this layer could compromise the entire transaction lifecycle.

Following replication, the transaction moves to the source presentation layer, labeled as element 208. At this stage, the transaction data is prepared for secure transmission by embedding acknowledgment information. This acknowledgment data includes metadata detailing the source blockchain, destination blockchain, and a unique acknowledgment token. The token acts as a secure identifier, enabling traceability and ensuring that the transaction can be validated at each subsequent stage. The presentation layer structures the transaction data into a cohesive payload, combining the raw transaction information with acknowledgment metadata to create a secure and organized package ready for encryption.

The source encryption layer, indicated as element 210, is responsible for encrypting the acknowledgment data generated by the presentation layer. This layer applies advanced cryptographic techniques to ensure the confidentiality and integrity of the transaction data during transmission. By encrypting the acknowledgment data, the system protects it from unauthorized access and tampering, safeguarding the transaction as it moves through potentially insecure communication channels. The encrypted acknowledgment data is then transmitted to the destination network, forming a secure communication link between the source and destination systems.

The source acknowledgment layer, represented as element 212, facilitates the transmission of encrypted acknowledgment data to the destination network. This layer ensures that the acknowledgment metadata is securely included with the transaction data, enabling downstream processes to verify the authenticity and integrity of the transaction. The acknowledgment layer plays a crucial role in maintaining the traceability of transactions, ensuring that each step in the process can be monitored and validated.

Upon reaching the destination distributed network, identified as element 203, the encrypted transaction data is received and processed by the destination layers. The destination memory pool orchestrator, shown as element 224, temporarily holds the transaction data while ensuring it is queued and organized for further processing. The destination replication layer, labeled as element 220, processes the replicated data received from the source. This layer decodes the replicated data to confirm its integrity and prepares it for additional processing. By maintaining the integrity of the replicated data, the destination replication layer ensures that the transaction remains consistent and reliable throughout the system.

The transaction then moves to the destination presentation layer, identified as element 218, where the acknowledgment data is extracted and organized. This layer ensures that the transaction data is properly structured and ready for decryption. The destination encryption layer, denoted as element 216, decrypts the acknowledgment data transmitted from the source, validating the authenticity and integrity of the transaction. By decrypting the data, this layer ensures that the transaction has not been altered or compromised during transmission, preserving its reliability.

The destination acknowledgment layer, shown as element 214, handles the acknowledgment process by generating secondary acknowledgment requests and processing the corresponding responses. This layer plays a pivotal role in validating the transaction by ensuring that acknowledgment data matches the expected criteria. The secondary acknowledgment request and secondary acknowledgment response flows are critical components of this process, allowing the system to verify the transaction's legitimacy through a secure and dynamic exchange of information. These processes help to isolate unauthorized or suspicious transactions, enhancing the overall security of the system.

Validated transactions are moved to the memory pool, labeled as element 226, where they are temporarily held for final validation. The blockchain of validators, represented as element 228, performs the final layer of validation by employing consensus mechanisms such as proof-of-stake or proof-of-work. These validators collectively analyze transaction data to confirm its legitimacy, providing an additional layer of security to the system. The validators also ensure that high-priority transactions are processed efficiently, even during periods of high network traffic. Transactions that fail validation or exhibit suspicious patterns are moved to the dead letter log, labeled as element 230. This log serves as a repository for failed or suspicious transactions, enabling further analysis and prioritization by system administrators and validators.

FIG. 2 demonstrates an architecture that integrates source and destination orchestration layers with memory pools, acknowledgment mechanisms, and validator blockchains. Each layer contributes to a secure, efficient, and scalable transaction management process, addressing critical challenges in cross-chain blockchain environments. By incorporating advanced techniques such as replication, encryption, and consensus-driven validation, this system ensures the integrity and reliability of transactions while providing a robust framework for managing vulnerabilities in distributed networks. The layered design allows for seamless scalability and adaptability, making it suitable for a wide range of blockchain applications and environments.

FIG. 3 provides an exemplary flow diagram illustrating the detailed sequence of operations involved in securely processing and validating transactions within a cross-chain blockchain environment. The flow begins at the source (300), where the system initiates the lifecycle of a transaction. At this stage, the source acts as the origin point, establishing the fundamental parameters of the transaction, including a unique transaction identifier, source and destination addresses, and other metadata critical for maintaining the traceability and integrity of the transaction throughout the system.

The process progresses as the transaction is initiated (302). During this step, the source collects and organizes all necessary transaction details and prepares them for entry into the orchestration layers. The initiation phase ensures that the transaction is fully formed and adheres to the required structure and security protocols, setting the stage for downstream processing. The transaction then enters the source orchestration layer (304), where acknowledgment data is generated. This acknowledgment data includes metadata such as the origin and destination blockchains and a unique acknowledgment token. The source orchestration layer employs an optimistic replication algorithm to create secure duplicates of the transaction data, ensuring redundancy and resilience against potential disruptions. Additionally, the orchestration layer applies techniques to encapsulate the acknowledgment data, integrating it seamlessly into the transaction payload.

The encapsulated acknowledgment data is transmitted to the destination orchestration layer (306) using an asynchronous handshake protocol. This protocol establishes a secure and reliable communication channel, enabling the efficient exchange of data between the source and destination layers. The asynchronous nature of the protocol allows for robust data flow even in the presence of network delays or interruptions, ensuring the continuity and integrity of the transaction. Upon arrival at the destination orchestration layer, the acknowledgment data undergoes decapsulation (308). This process extracts the embedded metadata, allowing the system to analyze and validate the transaction's integrity and authenticity. The extracted acknowledgment data serves as a critical checkpoint, verifying that the transaction has not been tampered with during transmission.

Following decapsulation, the destination orchestration layer generates a secondary acknowledgment request (310). This request is sent back to the source orchestration layer, creating a bidirectional communication loop to further validate the transaction. The secondary acknowledgment request is designed to confirm the legitimacy of the transaction by prompting a corresponding response from the source. The source responds by generating a secondary acknowledgment response (312), which includes verification tokens or additional metadata that authenticate the transaction. This response completes the secondary acknowledgment exchange, serving as a pivotal step in establishing the transaction's validity.

The system then evaluates whether the acknowledgment has been received and validated within a predefined timeframe (314). If the acknowledgment is successfully received, the transaction is moved to the memory pool (316) for additional processing. The memory pool acts as a staging area where transactions are organized and prioritized based on factors such as acknowledgment status and transaction priority. This prioritization ensures that high-priority transactions are processed promptly, while others are queued for further validation. If the acknowledgment is not received or fails validation, the transaction is directed to the dead letter log (320). This log functions as a repository for failed or suspicious transactions, storing metadata that can be analyzed to identify potential patterns or anomalies.

Once in the memory pool, the blockchain of validators initiates a search within the dead letter log (318) to determine if any similar sources or transactions have been registered previously. This step leverages historical data to identify recurring patterns, anomalies, or potential threats. If a similar source or transaction is found (322), the transaction is placed in a low-priority queue (324), allowing the system to focus on higher-priority transactions while still retaining the ability to re-evaluate lower-priority ones. If no similar source or transaction is found, the system proceeds to validate all remaining details of the transaction (326). This comprehensive validation involves analyzing the transaction's metadata, acknowledgment data, and historical patterns to ensure that it meets the system's security and reliability standards. Validators collectively provide consent using consensus mechanisms such as proof-of-stake or proof-of-work, adding an additional layer of security to the system.

Validated transactions are added to the blockchain (328), where they are recorded in an immutable ledger. This step finalizes the transaction's lifecycle, ensuring that it becomes a permanent and tamper-proof part of the distributed ledger. By maintaining a transparent and auditable record of validated transactions, the blockchain supports regulatory compliance and provides a reliable mechanism for forensic analysis and system improvement. FIG. 3 demonstrates a meticulously structured approach to transaction processing, highlighting the system's ability to adapt to varying conditions and protect against vulnerabilities while ensuring security, efficiency, and reliability in cross-chain blockchain environments.

FIG. 4 provides a detailed sequence diagram illustrating the step-by-step interactions between the key components of the invention as they process a transaction in a cross-chain blockchain environment. This sequence diagram visualizes the flow of communication and actions taken to ensure secure, efficient, and reliable transaction handling, while also addressing vulnerabilities inherent to such systems. The diagram incorporates elements such as the source blockchain, source orchestration, destination orchestration, validators or miners, the destination blockchain, and the dead letter log. Each element plays a vital role in the transaction lifecycle, contributing to a robust and scalable system.

The process begins when the source blockchain initiates a transaction (400). This step involves defining a transaction with attributes including a unique transaction identifier, source address, destination address, timestamp, and other transaction-specific details. These attributes form the basis for tracking and validating the transaction throughout the system. The source blockchain sends the transaction to the source orchestration layer, triggering the first level of processing.

At the source orchestration layer, the transaction undergoes replication using an optimistic replication algorithm (402). This algorithm creates a secure replica of the transaction data, ensuring redundancy and preserving the integrity of the original information. Replication is critical for safeguarding the transaction against potential disruptions during its lifecycle. Following replication, the source orchestration layer performs polymorphic (404). This encapsulation embeds acknowledgment information into the transaction payload, including metadata about the source blockchain, destination blockchain, and a unique acknowledgment token. The encapsulation process not only secures the data but also enhances traceability, ensuring that the transaction remains verifiable as it progresses through the system.

The encapsulated transaction is then transmitted to the destination orchestration layer (406). This step employs secure communication protocols, including lightweight encryption to protect the data and the inclusion of a cryptographic nonce to prevent replay attacks. The secure transmission ensures that the transaction reaches its destination without being intercepted or tampered with. Upon receiving the transaction, the destination orchestration layer initiates a decapsulation process to extract the acknowledgment information and verify its integrity. Decapsulation ensures that the transaction data has not been altered during transmission, providing a foundation for subsequent validation steps.

To further validate the transaction, the destination orchestration layer generates a secondary acknowledgment request (408). This request, part of the asynchronous handshake protocol, is sent back to the source orchestration layer to confirm the transaction's legitimacy. The source orchestration layer responds to the request by sending a secondary acknowledgment response (410), which includes a verification token or additional metadata. This response serves as proof of the transaction's authenticity and ensures that the source of the transaction is legitimate.

The destination orchestration layer evaluates the acknowledgment response to determine the transaction's validity. If the acknowledgment is successfully verified, the transaction is moved to the mempool for the second level of validation (412). The mempool acts as a temporary queue where transactions are prioritized based on acknowledgment status, risk scores, and predefined priority levels. This prioritization ensures that high-priority and legitimate transactions are processed promptly while suspicious or low-priority transactions receive additional scrutiny.

The transaction is then forwarded from the mempool to the blockchain of validators or miners for validation (416). The validators perform a comprehensive evaluation of the transaction using a hybrid consensus mechanism that combines proof-of-stake and proof-of-work. This hybrid approach balances efficiency and security, leveraging the strengths of both mechanisms. The validators also apply intelligent algorithms and machine learning models to analyze historical transaction data, detect anomalies, and dynamically adjust transaction priority levels. These advanced validation techniques enhance the system's ability to identify and mitigate potential risks.

Once the transaction is successfully validated, it is transmitted to the destination blockchain (418), where it is recorded in the distributed ledger (420). The destination blockchain creates a tamper-proof and immutable record of the transaction, ensuring transparency and accountability. This record serves as a secure and permanent reference for all validated transactions, supporting regulatory compliance and facilitating forensic analysis if required.

If the acknowledgment fails or the transaction is deemed invalid, the destination orchestration layer moves the transaction to the dead letter log (414). The dead letter log stores metadata for failed transactions, including timestamps of acknowledgment attempts, reasons for failure, and associated risk scores. This repository provides a mechanism for analyzing failed transactions, identifying patterns or anomalies, and determining whether specific transactions should be reprioritized or discarded. The dead letter log contributes to the system's adaptability and its ability to address potential vulnerabilities.

The sequence diagram in FIG. 4 captures the intricate interactions between the system components, showcasing their coordinated efforts to manage cross-chain transactions. Each step incorporates the invention's key features, including acknowledgment protocols, dynamic prioritization, secure transmission, and consensus-driven validation. The sequence reflects the invention's ability to handle complex transactions with high levels of security, scalability, and efficiency. By integrating advanced technologies and processes, the invention provides a comprehensive solution for addressing vulnerabilities in cross-chain blockchain environments.

FIG. 5 is an exemplary class diagram that meticulously outlines the structural components, attributes, and methods involved in the system for managing cross-chain blockchain transactions. It illustrates the relationships between the various classes and highlights the roles they play in facilitating secure, efficient, and reliable transaction processing. Each class encapsulates distinct functionality, ensuring modularity and scalability while addressing the complexities and vulnerabilities inherent in blockchain interoperability. The diagram includes the class names, numbers, attributes, and methods, which are described in extensive detail below to provide a comprehensive understanding of the system's design.

The Source Blockchain (500) class serves as the origin of all transactions entering the system. It is responsible for defining and initiating the fundamental parameters of each transaction. This class includes several key attributes: 'String transactionID', which uniquely identifies each transaction; 'String sourceAddress', which specifies the blockchain or node from which the transaction originates; 'String transactionDetails', which provides a detailed description of the transaction, including its purpose and metadata; and 'DateTime timestamp', which records the exact moment the transaction is created. These attributes ensure that every transaction is uniquely identifiable and traceable throughout its lifecycle. The methods associated with this class include 'initiateTransaction( ) void', which starts the transaction process by generating its initial data, and 'sendTransactionData( ) void', which transmits the transaction to the Source Orchestration (502) for further processing.

The Source Orchestration (502) class plays a critical role in preparing and processing transaction data after its initiation. This class contains attributes such as 'String replicationAlgorithm', which specifies the algorithm used to replicate transaction data securely and efficiently; 'String encapsulationType', which defines the method for embedding acknowledgment information into the transaction payload; 'String encryptionKey', which stores the cryptographic key utilized to encrypt transaction data for secure transmission; and 'String mempoolStatus', which indicates the status of the transaction within the memory pool, whether it is pending, processed, or awaiting further validation. The methods in this class include 'replicateTransaction( ) Transaction', which generates a secure replica of the transaction to ensure redundancy and data integrity, and 'encapsulateTransaction( ) EncapsulatedData', which wraps the transaction with acknowledgment metadata, enabling traceability and security. The method 'encryptData( ) EncryptedData' applies cryptographic techniques to secure the transaction payload, while 'sendEncapsulatedData( ) void' transmits the encapsulated transaction to the destination orchestration layer. Additionally, the Source Orchestration (502) class includes 'receiveAcknowledgment( ) void', which manages responses from the destination orchestration, and 'moveToDeadLetterLog( ) void', which isolates failed or suspicious transactions for further investigation.

The Destination Orchestration (504) class is responsible for handling transactions received from the Source Orchestration (502). It processes the encrypted and encapsulated transaction data to validate its integrity and authenticity. Attributes in this class include 'String decryptionKey', used to decrypt the incoming transaction data; 'Boolean acknowledgmentStatus', which tracks whether the transaction has been successfully acknowledged during the validation process; and 'String presentationData', which organizes transaction details for downstream processes such as final validation or recording. The methods of this class include 'decapsulateAcknowledgment( ) void', which extracts the acknowledgment metadata embedded in the transaction during the encapsulation process, and 'decryptData( ) TransactionData', which ensures that the transaction data has not been tampered with during transmission. The 'triggerSecondaryAcknowledgment( ) void' method initiates an additional validation step by generating a secondary acknowledgment request to the source, while 'forwardToDestinationBlockchain( ) void' transmits validated transactions to the Destination Blockchain (506) for final storage and recording.

The Destination Blockchain (506) class acts as the final repository for validated transactions. It maintains an immutable ledger, ensuring that all recorded transactions are secure, transparent, and tamper-proof. Attributes in this class include 'String ledgerID', which uniquely identifies the ledger; 'Boolean transactionValidationStatus', indicating whether a transaction has passed the validation process; and 'String consensusProof', which provides cryptographic evidence of the consensus achieved by the validators. The methods include 'addTransactionToLedger( ) void', which records validated transactions in the blockchain, and 'validateTransaction( ) Boolean', which evaluates the transaction against predefined criteria to confirm its legitimacy and compliance with system protocols.

The Blockchain Of Validators Miners (508) class is pivotal to the consensus mechanism, ensuring that all transactions are collectively validated by a decentralized network of participants. This class includes attributes such as 'String validationAlgorithm', defining the methodology used to evaluate transactions; 'String consensusMechanism', which specifies the consensus protocol in use, such as proof-of-stake or proof-of-work; and 'Array [String] minerList', which maintains a record of participating validators or miners. The methods in this class include 'performValidation( ) Boolean', which examines transaction details to confirm their validity; 'generateConsensusProof( ) String', which produces cryptographic evidence of consensus reached by the validators; and 'sendValidatedTransaction( ) void', which forwards approved transactions to the Destination Blockchain (506) for recording.

The Dead Letter Log (510) class serves as a repository for transactions that fail acknowledgment or validation processes. This class includes attributes such as 'String failedTransactionID', which uniquely identifies transactions that have been flagged as problematic; 'String reasonForFailure', which documents the cause of the failure; and 'DateTime timestamp', which records the time the transaction was logged in the system. The methods include 'logFailedTransaction( ) void', which isolates and records failed transactions for further analysis, and 'retrieve- FailedTransactions( ) Array [Transaction]', which enables system administrators and validators to review and analyze failed transactions for potential remediation or future optimization.

This class diagram encapsulates the intricate relationships between the system's components, demonstrating how transactions are created, processed, validated, and either recorded or isolated. The interconnections between these classes ensure that every transaction is handled securely and efficiently, with robust mechanisms for redundancy, encryption, validation, and error management. FIG. 5 exemplifies the system's modular and scalable design, providing a comprehensive framework for managing vulnerabilities in cross-chain blockchain environments. By integrating advanced methods and processes at every stage, this architecture ensures the integrity, reliability, and adaptability of the system in diverse and complex operational scenarios.

Pseudocode exemplars for implementing various aspects of this disclosure are set forth below with explanations for reference.

The pseudocode presented here is a comprehensive implementation of the invention, addressing every aspect of the system with its key, core, and unique features. This implementation captures the entire transaction lifecycle, including initiation, validation, acknowledgment exchange, consensus, and error handling, while ensuring modularity, security, and efficiency.

```
// Initialize System
initialize System {
    create Source_Blockchain
    create Source_Orchestration
    create Destination_Orchestration
    create Destination_Blockchain
    create Blockchain_Of_Validators
    create Dead_Letter_Log
}
// Source Blockchain
function initiate_transaction(transaction_id, source_address, details,
timestamp):
    transaction = {
        "transactionID": transaction_id,
        "sourceAddress": source_address,
        "transactionDetails": details,
        "timestamp": timestamp
    }
    return transaction
function send_transaction(transaction, source_orchestration):
    source_orchestration.receive_transaction(transaction)
// Source Orchestration
class Source_Orchestration {
    mempool = [ ]
    function receive_transaction(transaction):
        replicated_transaction = replicate_transaction(transaction)
        encapsulated_transaction = encapsulate_transaction(replicated_
        transaction)
        encrypted_transaction = encrypt_transaction(encapsulated_transaction)
        send_to_destination(encrypted_transaction)
    function replicate_transaction(transaction):
        return transaction.copy( )
    function encapsulate_transaction(transaction):
        transaction["acknowledgmentData"]                        =
generate_acknowledgment_data(transaction)
        return transaction
    function encrypt_transaction(transaction):
        encryption_key = get_encryption_key( )
        encrypted_transaction = encrypt_data(transaction, encryption_key)
        return encrypted_transaction
    function send_to_destination(transaction):
        Destination_Orchestration.receive_transaction(transaction)
    function handle_acknowledgment(ack_data):
        if validate_acknowledgment(ack_data):
            return True
        else:
```

-continued

```
        log_to_dead_letter(ack_data["transactionID"])
    function log_to_dead_letter(transaction_id):
        Dead_Letter_Log.store_failed_transaction(transaction_id,
"Acknowledgment failed")
}
// Destination Orchestration
class Destination_Orchestration {
    mempool = [ ]
    function receive_transaction(transaction):
        if validate_and_acknowledge(transaction):
            mempool.append(transaction)
        else:
            Dead_Letter_Log.store_failed_transaction(transaction
["transactionID"], "Validation failed")
    function validate_and_acknowledge(transaction):
        acknowledgment_data                              =
decapsulate_data(transaction["acknowledgmentData"])
        if validate_data(acknowledgment_data):
            return send_secondary_acknowledgment(transaction)
        return False
    function send_secondary_acknowledgment(transaction):
        ack_response                                     =
Source_Orchestration.handle_acknowledgment_response(transaction
["transactionID"])
        return ack_response
    function forward_to_blockchain(transaction):
        Destination_Blockchain.add_transaction(transaction)
}
// Destination Blockchain
class Destination_Blockchain {
    ledger = [ ]
    function add_transaction(transaction):
        if validate_transaction(transaction):
            ledger.append(transaction)
        else:
            Dead_Letter_Log.store_failed_transaction(transaction
["transactionID"], "Consensus validation failed")
    function validate_transaction(transaction):
        return Blockchain_Of_Validators.perform_validation(transaction)
}
// Blockchain of Validators
class Blockchain_Of_Validators {
    validators = [ ]
    function perform_validation(transaction):
        return all(validator.validate(transaction) for validator in validators)
    function generate_consensus_proof(transaction):
        return hash(transaction)
}
// Dead Letter Log
class Dead_Letter_Log {
    failed_transactions = [ ]
    function store_failed_transaction(transaction_id, reason):
        failed_transactions.append({
            "transactionID": transaction_id,
            "reason": reason
        })
    function retrieve_failed_transactions():
        return failed_transactions
// Main Execution Flow
function main( ):
    system = initialize System
    transaction = initiate_transaction(
        "txn123",
        "source1",
        {"amount": 100, "currency": "USD"},
        "2025-01-13T12:00:00"
    )
    send_transaction(transaction, Source_Orchestration)
```

The pseudocode starts by initializing the system, creating all the essential components, including the source blockchain, orchestration layers, destination blockchain, validator mechanisms, and dead letter logging system. Transactions are initiated in the 'Source_Blockchain' with attributes such as transaction ID, source address, transaction details, and a timestamp. These transactions are sent to the 'Source_Orchestration' for processing.

The 'Source_Orchestration' handles transaction preparation, replicating the transaction data for redundancy and applying acknowledgment encapsulation. The transaction is then encrypted with a secure key before being sent to the 'Destination_Orchestration'. If acknowledgment validation fails at any stage, the transaction is logged in the 'Dead_Letter_Log'.

The 'Destination_Orchestration' receives the encrypted transaction, decapsulates the acknowledgment data, and performs a secondary acknowledgment request to confirm the transaction's validity. If validated, the transaction is forwarded to the 'Destination_Blockchain', where it undergoes a final consensus-based validation by the 'Blockchain_Of_Validators'. This involves all validators assessing the transaction to ensure its legitimacy and generating a cryptographic proof of consensus.

The 'Dead_Letter_Log' captures all failed transactions, storing detailed reasons for their failure. These logs are accessible for further analysis, enabling administrators to identify and address vulnerabilities.

This pseudocode fully implements the invention, addressing each core feature and ensuring a robust, secure, and scalable system for managing cross-chain blockchain transactions. It captures all key processes, including transaction initiation, acknowledgment validation, encryption, consensus mechanisms, and error handling, providing a comprehensive framework for the invention.

A skilled artisan, upon reviewing the disclosure, will appreciate that there are numerous alternatives, modifications, combinations, and customizations that can be made to the systems and methods described herein. In particular, the systems and methods described in the invention allow for numerous alternatives, modifications, combinations, and customizations that can be implemented to adapt to various needs and applications, while maintaining the spirit and scope of the disclosure. These adaptations enhance flexibility, scalability, and security across a range of blockchain environments.

The invention can support alternative consensus mechanisms beyond proof-of-stake or proof-of-work. For example, Delegated Proof-of-Stake, Byzantine Fault Tolerance, or Directed Acyclic Graph-based consensus mechanisms may be employed. These mechanisms can improve efficiency, scalability, and fault tolerance based on the specific needs of the blockchain network. Additionally, the timeframe for acknowledgment responses in the asynchronous handshake protocol can be customized. This allows for dynamic adjustment based on network conditions, transaction priority, or user-defined preferences, ensuring both flexibility and responsiveness in the system.

Machine learning models can be integrated into the invention to enhance transaction validation and prioritization processes. Algorithms such as anomaly detection or clustering could identify suspicious transaction patterns more effectively, improving system adaptability and accuracy. Layer-specific optimizations can also be introduced, such as replacing the encryption layer with post-quantum cryptographic algorithms to prepare the system for future threats from quantum computing. These modifications can strengthen the system's ability to address emerging challenges in blockchain security.

The invention can operate in hybrid blockchain environments that combine public and private blockchain systems. For instance, acknowledgment and validation processes can occur within a private blockchain to enhance speed and privacy, while transaction records are written to a public blockchain for transparency. Similarly, the dead letter log can be expanded to include additional analysis tools. Automated transaction classification and scoring based on failure patterns can aid in prioritizing re-evaluation of transactions stored in the log.

The system is capable of supporting multi-chain scalability. This could be achieved by implementing hierarchical mempool orchestration layers or custom routing protocols to manage transactions across multiple interconnected blockchain networks. In addition, alternative data encapsulation techniques can be explored. Nested or layered encapsulation methods could be employed to cater to specialized applications, such as lightweight IoT environments or high-security financial transactions.

Validator incentive models can also be diversified. Instead of solely offering monetary rewards, the system could provide validators with reputation scores, governance tokens, or other non-monetary incentives to encourage broader participation and maintain network integrity. Real-time monitoring and alerting systems could be integrated to detect anomalies or breaches in the acknowledgment and validation processes, further enhancing the system's proactive security measures.

The system allows for user-customized prioritization algorithms. Users could define specific criteria for prioritizing their transactions, such as assigning higher priority to transactions involving specific counterparties or exceeding a predefined value threshold. Additionally, external authentication systems, such as biometric or multi-factor authentication, could be incorporated to add an extra layer of security during acknowledgment and validation processes.

Dynamic resource allocation mechanisms can be introduced to optimize system performance during periods of varying network load. For example, computational resources could be redirected to the mempool orchestration layer during high transaction volumes to maintain efficiency. Validators could also participate in decentralized governance models, enabling collective decision-making on rule updates, system enhancements, and other modifications to the platform.

Integration with off-chain data sources such as oracles can provide valuable context for transaction validation. For example, real-time data on exchange rates or user reputation scores could inform prioritization decisions, improving both accuracy and efficiency. Privacy-preserving technologies, including zero-knowledge proofs or homomorphic encryption, could be incorporated to ensure user privacy while maintaining the robustness of transaction validation processes.

The invention can be adapted for lightweight blockchain environments, such as those used in IoT or edge computing. Simplified acknowledgment protocols and reduced computational requirements could enable deployment on resource-constrained devices. Similarly, integration with Layer 2 solutions, such as state channels or rollups, could improve throughput and reduce transaction costs by handling certain validation processes off-chain.

Blockchain interoperability can be enhanced by implementing cross-chain protocols or adopting interoperability standards such as Polkadot or Cosmos. These protocols would enable seamless communication between diverse blockchain networks. Comprehensive logging and analytics dashboards could also be introduced to provide real-time insights into transaction flows, validation outcomes, and dead letter log trends, enhancing transparency and operational decision-making.

These alternatives, modifications, combinations, and customizations enable the invention to adapt to a wide variety of operational contexts, use cases, and user preferences while retaining its core functionalities and innovative features. The invention's versatility ensures its relevance in the rapidly evolving field of blockchain technology.

Although the present technology has been described based on what is currently considered the most practical and preferred implementations, it is to be understood that this detail is only for that purpose and this disclosure is not limited to the sample descriptions and implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method for managing vulnerabilities in cross-chain blockchain transactions, comprising:

detecting, by a source blockchain, an initiation of a transaction, wherein the transaction comprises a transaction identifier, source address, transaction details, and a timestamp;

replicating, by a source orchestration layer, transaction data using an optimistic replication algorithm to create a secure replica of the transaction without altering the original transaction details;

encapsulating, by the source orchestration layer, the replicated transaction data using polymorphic encapsulation to embed acknowledgment information within a transaction payload;

encrypting, by an encryption layer within the source orchestration layer, the encapsulated transaction data using lightweight cryptography to ensure confidentiality and integrity during transmission;

transmitting, by the source orchestration layer, the encrypted transaction data to a destination orchestration layer over a communication link;

decapsulating, by the destination orchestration layer, the acknowledgment information from the encrypted transaction data to verify an acknowledgment status;

transmitting, by the destination orchestration layer, a secondary acknowledgment request to the source orchestration layer using an asynchronous handshake protocol;

receiving, by the source orchestration layer, the secondary acknowledgment request, and transmitting a secondary acknowledgment response to the destination orchestration layer within a predefined acknowledgment timeframe;

determining, by the destination orchestration layer, whether the acknowledgment response is received within the predefined acknowledgment timeframe;

moving, by the destination orchestration layer, the transaction to a dead letter log if the acknowledgment response is not received within the predefined acknowledgment timeframe;

moving, by the destination orchestration layer, the transaction to a destination mempool for further processing if the acknowledgment response is received within the predefined acknowledgment timeframe;

validating, by a blockchain of validators, the transaction in the destination mempool using a consensus mechanism to confirm its legitimacy, wherein the consensus mechanism comprises analyzing historical transaction data and applying priority algorithms;

transmitting, by the blockchain of validators, a validation result to a destination blockchain, wherein a valid transaction is added to the destination blockchain, and an invalid transaction is moved to the dead letter log; and prioritizing, by the blockchain of validators, transactions in the dead letter log based on predefined criteria and re-evaluating such transactions for potential future processing.

2. The method of claim 1, wherein the acknowledgment information encapsulated by the source orchestration layer further comprises metadata detailing the source blockchain, destination blockchain, and a unique transaction signature for enhanced traceability.

3. The method of claim 2, wherein the metadata within the acknowledgment information is encrypted by the encryption layer using a public key of the destination orchestration layer to prevent unauthorized access during transmission.

4. The method of claim 3, wherein the destination orchestration layer decapsulates the acknowledgment information using a private key corresponding to the public key of the source orchestration layer to ensure the integrity of the transmitted transaction data.

5. The method of claim 4, wherein the predefined acknowledgment timeframe for receiving the secondary acknowledgment response is dynamically adjusted based on network conditions, transaction priority, or historical acknowledgment patterns.

6. The method of claim 5, wherein the dead letter log stores additional metadata for each transaction, including a reason for failure, the timestamp of acknowledgment attempts, and a transaction risk score based on predefined security metrics.

7. The method of claim 6, wherein the blockchain of validators uses a machine learning model to analyze historical transaction data in the destination mempool to predict potential transaction risks and assign dynamic priority levels.

8. The method of claim 7, wherein the consensus mechanism employed by the blockchain of validators comprises a hybrid model combining proof-of-stake and proof-of-work to optimize transaction validation efficiency and security.

9. The method of claim 8, wherein the blockchain of validators applies intelligent algorithms to review transactions in the dead letter log, reprioritize such transactions, and determine their validity based on predefined risk tolerance thresholds.

10. The method of claim 9, wherein the destination blockchain maintains an audit log of all validated transactions, acknowledgment exchanges, and consensus decisions to provide a tamper-proof record for compliance and forensic analysis.

11. A method for managing vulnerabilities in cross-chain blockchain transactions, comprising:

detecting, by a source blockchain, an initiation of a transaction, wherein the transaction comprises a transaction identifier, a source address, transaction details, a timestamp, and an initial priority level determined based on predefined transaction criteria;

replicating, by a source orchestration layer, transaction data using an optimistic replication algorithm to create a secure replica of the transaction without altering the original transaction details, wherein the replicated transaction data includes metadata specifying the source blockchain, destination blockchain, and a unique transaction signature;

encapsulating, by the source orchestration layer, the replicated transaction data using polymorphic encapsulation to embed acknowledgment information within a transaction payload, wherein the acknowledgment information includes the metadata and an acknowledgment token generated by the source orchestration layer to uniquely identify an acknowledgment state of the transaction;

encrypting, by an encryption layer within the source orchestration layer, the encapsulated transaction data using lightweight cryptography to ensure confidentiality and integrity during transmission, wherein the acknowledgment token and metadata are encrypted using a public key associated with a destination orchestration layer to prevent unauthorized access;

transmitting, by the source orchestration layer, the encrypted transaction data to the destination orchestration layer over a secure communication link, wherein a transmission protocol is configured to prevent replay attacks by embedding a cryptographic nonce in the transaction payload;

decapsulating, by the destination orchestration layer, the acknowledgment information from the encrypted transaction data, wherein the acknowledgment information is decrypted using a private key corresponding to the public key of the source orchestration layer to validate the integrity and authenticity of the transaction data;

transmitting, by the destination orchestration layer, a secondary acknowledgment request to the source orchestration layer using an asynchronous handshake protocol, wherein the secondary acknowledgment request includes a verification token generated by the destination orchestration layer to establish the validity of the transaction;

receiving, by the source orchestration layer, the secondary acknowledgment request, and transmitting a secondary acknowledgment response to the destination orchestration layer within a predefined acknowledgment timeframe, wherein the acknowledgment timeframe is dynamically adjusted based on network latency, transaction priority, and historical acknowledgment patterns;

determining, by the destination orchestration layer, whether the secondary acknowledgment response is received within the predefined acknowledgment timeframe, wherein the determination includes validating the response against the verification token generated by the destination orchestration layer;

moving, by the destination orchestration layer, the transaction to a dead letter log if the acknowledgment response is not received within the predefined acknowledgment timeframe, wherein the dead letter log stores metadata for each transaction, including a reason for failure, timestamps of acknowledgment attempts, the cryptographic nonce used during transmission, and a transaction risk score based on predefined security metrics and historical transaction patterns;

moving, by the destination orchestration layer, the transaction to a destination mempool for further processing if the acknowledgment response is received within the predefined acknowledgment timeframe, wherein the destination mempool temporarily queues transactions for validation and prioritizes them based on their risk scores, priority levels, and acknowledgment status;

validating, by a blockchain of validators, the transaction in the destination mempool using a consensus mechanism to confirm its legitimacy, wherein the consensus mechanism comprises a hybrid model combining proof-of-stake and proof-of-work, and wherein the blockchain of validators utilizes a machine learning model to analyze historical transaction data, detect anomalies, and dynamically assign updated priority levels to transactions;

transmitting, by the blockchain of validators, a validation result to the destination blockchain, wherein a valid transaction is added to the destination blockchain, and an invalid transaction is moved to the dead letter log, wherein the validation result includes cryptographic evidence of consensus derived from validator agreement;

prioritizing, by the blockchain of validators, transactions in the dead letter log based on predefined criteria, wherein intelligent algorithms are applied to identify potential resubmission opportunities for transactions, reprioritize them based on updated risk thresholds, and determine whether to resubmit or discard each transaction; and adding, by the destination blockchain, validated transactions to the blockchain, wherein the destination blockchain records a tamper-proof audit log of all validated transactions, acknowledgment exchanges, consensus decisions, and validation attempts, enabling compliance with regulatory requirements and facilitating forensic analysis for detected anomalies or failures.

12. A system for managing vulnerabilities in cross-chain blockchain transactions, comprising:

a source blockchain configured to initiate a transaction, wherein the transaction includes a transaction identifier, a source address, transaction details, a timestamp, and an initial priority level determined based on predefined transaction criteria;

a source orchestration layer coupled to the source blockchain and configured to replicate transaction data using an optimistic replication algorithm to create a secure replica of the transaction without altering its original details, and to encapsulate the replicated transaction data using polymorphic encapsulation to embed acknowledgment information, wherein the acknowledgment information includes metadata specifying the source blockchain, destination blockchain, and a unique acknowledgment token generated by the source orchestration layer;

an encryption layer within the source orchestration layer configured to encrypt the encapsulated transaction data using lightweight cryptography, wherein the acknowledgment token and metadata are encrypted using a public key associated with a destination orchestration layer to ensure confidentiality and prevent unauthorized access during transmission;

a transmission module within the source orchestration layer configured to transmit the encrypted transaction data to the destination orchestration layer over a secure communication link, wherein the communication link embeds a cryptographic nonce in a transaction payload to prevent replay attacks;

a destination orchestration layer configured to receive and decapsulate the acknowledgment information from the encrypted transaction data, wherein a decapsulation process involves decrypting the acknowledgment information using a private key corresponding to the public key of the source orchestration layer to validate integrity and authenticity of the transaction data;

a handshake protocol module within the destination orchestration layer configured to transmit a secondary acknowledgment request to the source orchestration layer, wherein the secondary acknowledgment request includes a verification token generated by the destination orchestration layer to establish the validity of the transaction;

an acknowledgment response module within the source orchestration layer configured to receive the secondary acknowledgment request and transmit a secondary acknowledgment response to the destination orchestration layer within a predefined acknowledgment timeframe, wherein the acknowledgment timeframe is dynamically adjusted based on network latency, transaction priority, and historical acknowledgment patterns;

a decision module within the destination orchestration layer configured to determine whether the secondary acknowledgment response is received within the predefined acknowledgment timeframe, wherein the determination includes verifying the response against the verification token generated by the destination orchestration layer;

a dead letter log coupled to the destination orchestration layer and configured to store transactions for which acknowledgment responses are not received within the predefined acknowledgment timeframe, wherein the dead letter log includes metadata for each transaction, including a reason for failure, timestamps of acknowledgment attempts, the cryptographic nonce used during transmission, and a transaction risk score based on predefined security metrics and historical transaction patterns;

a destination mempool coupled to the destination orchestration layer and configured to queue transactions for further processing if the acknowledgment response is received within the predefined acknowledgment timeframe, wherein the mempool prioritizes transactions based on risk scores, priority levels, and acknowledgment status;

a blockchain of validators coupled to the destination mempool and configured to validate transactions using a consensus mechanism to confirm legitimacy, wherein the consensus mechanism comprises a hybrid model combining proof-of-stake and proof-of-work, and wherein the blockchain of validators includes a machine learning model to analyze historical transaction data, detect anomalies, and dynamically assign updated priority levels to transactions;

a validation result module within the blockchain of validators configured to transmit a validation result to a destination blockchain, wherein the validation result includes cryptographic evidence of consensus derived from validator agreement, and wherein valid transactions are added to the destination blockchain while invalid transactions are moved to the dead letter log;

a prioritization module within the blockchain of validators configured to review transactions in the dead letter log and prioritize them based on predefined criteria, wherein intelligent algorithms are applied to determine whether to resubmit or discard each transaction based on updated risk thresholds; and a destination blockchain configured to record validated transactions, wherein the destination blockchain maintains a tamper-proof audit log of all validated transactions, acknowledgment exchanges, consensus decisions, and validation attempts, enabling compliance with regulatory requirements and facilitating forensic analysis for detected anomalies or failures.

13. The system of claim 12, wherein the acknowledgment information embedded by the source orchestration layer further comprises a cryptographic hash of the transaction details and metadata to ensure data integrity during encapsulation and transmission.

14. The system of claim 13, wherein the encryption layer within the source orchestration layer employs post-quantum cryptographic algorithms to provide resistance against quantum computing attacks while maintaining lightweight processing requirements for efficient transaction handling.

15. The system of claim 14, wherein the transmission module includes a monitoring component configured to dynamically adjust the cryptographic nonce embedded in the transaction payload based on real-time network conditions to enhance security against replay and timing-based attacks.

16. The system of claim 15, wherein the destination orchestration layer includes a verification module configured to cross-reference the decapsulated acknowledgment information with a historical transaction ledger to identify and flag potential duplicate transactions.

17. The system of claim 16, wherein the handshake protocol module transmits the secondary acknowledgment request with a dynamically generated challenge-response token to authenticate the source orchestration layer and prevent spoofing attempts.

18. The system of claim 17, wherein the acknowledgment response module within the source orchestration layer includes a failover mechanism that routes the secondary acknowledgment response through an alternative communication channel if the primary channel experiences connectivity issues or latency.

19. The system of claim 18, wherein the blockchain of validators utilizes a decentralized nomination system to weight validator contributions based on their historical accuracy and reliability in validation processes, ensuring that highly trusted validators have a greater influence on the consensus mechanism.

20. The system of claim 19, wherein the destination blockchain includes a machine learning-powered anomaly detection module configured to analyze the audit log for patterns indicative of emerging threats, fraud, or non-compliant behaviors, enabling proactive network defense and operational adjustments.

\* \* \* \* \*